US012672167B2

(12) United States Patent
Zhang

(10) Patent No.: US 12,672,167 B2
(45) Date of Patent: Jun. 30, 2026

(54) METHOD AND DEVICE IN NODES USED FOR WIRELESS COMMUNICATION

(71) Applicant: Apogee 5G Global, LLC, Plano, TX (US)

(72) Inventor: Xiaobo Zhang, Shanghai (CN)

(73) Assignee: Apogee Networks, LLC, Dallas, TX (US)

( * ) Notice: Subject to any disclaimer, the term of this patent is extended or adjusted under 35 U.S.C. 154(b) by 337 days.

(21) Appl. No.: 17/901,878

(22) Filed: Sep. 2, 2022

(65) Prior Publication Data

US 2022/0417992 A1     Dec. 29, 2022

Related U.S. Application Data

(63) Continuation of application No. PCT/CN2021/079651, filed on Mar. 9, 2021.

(30) Foreign Application Priority Data

Mar. 11, 2020   (CN) ........................ 202010167010.X
Apr. 14, 2020   (CN) ........................ 202010289165.0

(51) Int. Cl.
H04L 12/00        (2006.01)
H04L 5/00         (2006.01)
H04W 74/0808      (2024.01)

(52) U.S. Cl.
CPC ....... H04W 74/0808 (2013.01); H04L 5/0048 (2013.01)

(58) Field of Classification Search
CPC .............. H04W 74/0808; H04W 24/10; H04L 5/0048; H04L 5/0094; H04L 1/0026;
(Continued)

(56) References Cited

U.S. PATENT DOCUMENTS 9,198,071 B2 * 11/2015 Geirhofer ............. H04L 1/0026
9,991,942 B2 *  6/2018 Onggosanusi ....... H04B 7/0479
(Continued)

FOREIGN PATENT DOCUMENTS

CN        107949067 A     4/2018
CN        108207029 A     6/2018
(Continued)

OTHER PUBLICATIONS

Song Y, CN 112835462 A, Method For Detecting Wrong Touch Operation Of Touch Panel, Involves Determining Touch Point Coordinates Corresponding To Touch Operation According To Capacitance Sensing Information Of Second Type Of Sensing Channel, 2019 (Year: 2019).*
(Continued)

*Primary Examiner* — Frantz Coby
(74) *Attorney, Agent, or Firm* — Volpe Koenig

(57)                ABSTRACT

The present application discloses a method and a device in nodes used for wireless communications. The first node receives a first signaling and a second signaling; and performs a first channel sensing operation on a first sub-band; and transmits a first radio signal in a first time-frequency resource group on the first sub-band, or, drops transmitting a first radio signal in a first time-frequency resource group on the first sub-band. Herein, the first signaling is used to determine a first reference signal resource group, the first signaling being non-unicast; the second signaling indicates a second reference signal resource group; when the first time-frequency resource group belongs to a first time window in time domain. With the method provided in the present application, the type of channel sensing operation can be determined according to spatial parameters of a radio signal, which helps enhance the transmission opportunity and reduce the overhead.

20 Claims, 10 Drawing Sheets

(58) Field of Classification Search

CPC ..... H04L 5/005; H04L 5/0023; H04L 5/0051; H04L 5/0044; H04B 7/0626; H04B 7/0456

USPC .................................................. 370/329, 252

See application file for complete search history.

(56) References Cited

U.S. PATENT DOCUMENTS

| | | | | |
|---|---|---|---|---|
| 10,708,952 | B2 * | 7/2020 | Lee ....................... | H04L 5/0035 |
| 10,742,562 | B2 * | 8/2020 | Si .......................... | H04W 72/23 |
| 10,958,326 | B2 * | 3/2021 | Rahman ............ | H04W 72/0446 |
| 11,356,881 | B2 * | 6/2022 | Rahman ................ | H04L 5/0023 |
| 11,438,116 | B2 * | 9/2022 | Taherzadeh Boroujeni ................ H04L 5/0048 |
| 11,490,422 | B2 * | 11/2022 | Liu ................... | H04W 74/0808 |
| 2013/0242778 | A1 * | 9/2013 | Geirhofer ............. | H04L 1/0026 370/252 |
| 2015/0092573 | A1 | 4/2015 | Zhang | |
| 2017/0019909 | A1 * | 1/2017 | Si .......................... | H04W 16/14 |
| 2017/0195031 | A1 * | 7/2017 | Onggosanusi ....... | H04B 7/0626 |
| 2017/0359808 | A1 | 12/2017 | Dinan | |
| 2018/0255578 | A1 | 9/2018 | Kim | |
| 2019/0059106 | A1 | 2/2019 | Zhang | |
| 2019/0260448 | A1 * | 8/2019 | Rahman ............... | H04B 7/0626 |
| 2019/0273547 | A1 * | 9/2019 | Onggosanusi ........ | H04L 1/0026 |
| 2019/0386771 | A1 * | 12/2019 | Liu ....................... | H04B 7/0689 |
| 2021/0028900 | A1 * | 1/2021 | Manolakos ........... | H04L 5/0044 |
| 2021/0091903 | A1 * | 3/2021 | Taherzadeh Boroujeni ................ H04W 72/23 |
| 2021/0184744 | A1 * | 6/2021 | Pezeshki ............... | H04L 5/0048 |
| 2021/0368544 | A1 * | 11/2021 | Liu ................... | H04W 74/0808 |
| 2022/0376760 | A1 * | 11/2022 | Rahman ............... | H04B 7/0626 |
| 2025/0247883 | A1 * | 7/2025 | Hwang ................. | H04L 1/1822 |

FOREIGN PATENT DOCUMENTS

| | | | | | |
|---|---|---|---|---|---|
| CN | 109716853 | A | | 5/2019 | |
| CN | 110100492 | A | | 8/2019 | |
| CN | 110138429 | A | | 8/2019 | |
| CN | 110234170 | A | | 9/2019 | |
| CN | 110366264 | A | | 10/2019 | |
| WO | 2019160741 | A1 | | 8/2019 | |
| WO | WO-2020239055 | A1 * | 12/2020 | ........... | H04B 7/0626 |
| WO | WO-2020256516 | A2 * | 12/2020 | ........... | H04L 1/0693 |
| WO | WO-2021030595 | A1 * | 2/2021 | ............. | H04L 5/005 |

OTHER PUBLICATIONS

Liang W et al., CN 109936875 A, Priority Based Dual-Channel Medium Access Controlling Method, Involves Generating Sensing Node In Different Types Of Data And Depended On Data Priority, And Performing Grab Operation Of Access Operation On Data Channel And Control Channel, 2017 (Year: 2017).*

Dong Y et al., CN 103530501 A, Multi-Sensing Channel Interaction Stress Assistant Decision Experiment Method, Involves Determining Priority Order In Reaction-Type Stress State, And Performing Channel Interaction Stress Assistant Decision Experimental Operation, 2013 (Year: 2013).*

ISR received in application No. PCT/CN2021/079651 dated May 21, 2021.

First Search Report of Chinses patent application No. CN202010167010.X dated Mar. 29, 2022.

First Search Report of Chinses patent application No. CN202010289165.0 dated Mar. 16, 2022.

Notification to Grant Patent Right for Invention of Chinses patent application No. CN202010167010.X dated Aug. 1, 2022.

Notification to Grant Patent Right for Invention of Chinses patent application No. CN202010289165.0 dated Mar. 28, 2022.

First Office Action of Chinses patent application No. CN202010167010.X dated Apr. 6, 2022.

Huawei, HiSilicon DL channels and signals in NR unlicensed band 3GPP TSG RAN WG1 Meeting #96bis R1-1903926 Mar. 29, 2019.

Nokia, Alcatel-Lucent Shanghai Bell on Two-Stage UL scheduling for eLAA 3GPP TSG RAN WG1 Meeting #86 R1-167074 Aug. 26, 2016.

Third Generation Partnership Project, "Technical Specification Group Radio Access Network; Study on Licensed-Assisted Access to Unlicensed Spectrum; (Release 13)," 3GPP TR 36.889 V13.0.0 (Jun. 2015).

Third Generation Partnership Project, "Technical Specification Group Radio Access Network; Physical layer procedures for shared spectrum channel access (Release 16)," 3GPP TS 37.213 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network; Study on NR-based access to unlicensed spectrum (Release 16)," 3GPP TR 38.889 V16.0.0 (Dec. 2018).

* cited by examiner

METHOD AND DEVICE IN NODES USED FOR WIRELESS COMMUNICATION

CROSS REFERENCE TO RELATED APPLICATIONS

This application is a continuation of International Application No. PCT/CN2021/079651, filed Mar. 9, 2021, claims the priority benefit of Chinese Patent Application No. 202010167010.X, filed on Mar. 11, 2020, and the priority benefit of Chinese Patent Application No. 202010289165.0, filed on Apr. 14, 2020, the full disclosure of which is incorporated herein by reference.

BACKGROUND

Technical Field

The present application relates to transmission methods and devices in wireless communication systems, and in particular to a transmission scheme and a device related to Unlicensed Spectrum in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

A key technology in NR is to support beam-based signal transmission, a major application scenario of which is to enhance the coverage of an NR apparatus working in a millimeter-wave band, for instance, a band larger than 6 GHz. Besides, in a lower band (e.g., a band smaller than 6 GHz), the technique of beam-based transmission is also required for supporting massive antennas. By weighted processing of antenna arrays, a radio frequency signal will form a stronger beam in a specific spatial direction, while in other directions the signal is weaker. Through operations like beam measurement and beam feedback, the beams of a transmitter and a receiver can be aligned so that the signals can be transmitted and received with a stronger power, thus improving the coverage performance. Beam measurement and feedback by an NR system working in a millimeter-wave band can be done through multiple SS/PBCH blocks (SSBs) and CSI-RSs. Different SSBs or CSI-RSs can be transmitted via different beams. A User Equipment (UE) measures each SSB or CSI-RS sent from a next generation Node B (gNB) and sends back an SSB index or a CSI-RS resource number, thus completing beam alignment.

In a traditional cellular system, data transmission only can occur on Licensed Spectrum, however, as the traffic amount increases rapidly, particularly in some urban areas, the Licensed Spectrum may hardly be sufficient to satisfy the demand for the amount of traffics. The 3GPP Release 17 will consider to expand NR applications to Unlicensed Spectrum above 52.6 GHz. To ensure compatibility with other access technologies on Unlicensed Spectrum, the technique of Listen Before Talk (LBT) is used for avoidance of interference resulting from multiple transmitters simultaneously occupying the same frequency resources. For Unlicensed Spectrum above 52.6 GHz, since the signal transmission based on beams is apparently directional, it would be better adopting the Directional LBT to prevent interferences.

In a procedure of Category 4 LBT (Cat 4 LBT, see 3GPP TR36.889) in LTE, a transmitter (i.e., a base station or UE) firstly performs energy detection in a Defer Duration, if the result of detection is channel idleness, it will perform backoff and perform energy detection within the backoff time. The backoff time is counted with Clear Channel Assessment (CCA) slot durations as the measurement unit, and a number of slot durations for backoff is randomly selected by the transmitter in a Contention Window Size (CWS). Therefore, the duration of Cat 4 LBT is uncertain. The Category 2 LBT (Cat 2 LBT, see 3GPP TR36.889) is another type of LBT. The Cat 2 LBT determines whether a channel is idle by assessing the energy in a specific period of time. Therefore, the duration of Cat 2 LBT is certain. A similar mechanism is used in NR. The Cat 4 LBT is also called Type 1 downlink channel access procedures or Type 1 uplink channel access procedures; the Cat 2 LBT is also called Type 2 downlink channel access procedures or Type 2 uplink channel access procedures. The specific definition can be found in 3 gpp TS37.213. Cat 4 LBT in the present application is also used for representing Type 1 downlink channel access procedures or Type 1 uplink channel access procedures, and Cat 2 LBT in the present application is also used for representing Type 2 downlink channel access procedures or Type 2 uplink channel access procedures.

In NR Unlicensed Spectrum, a gNB or a UE needs to use Cat 4 LBT when starting a new Channel Occupancy Time (COT). After a successful completion of Cat 4 LBT, the gNB can determine a COT and notifies the UE of a duration of the COT. Within the COT acquired by the gNB, when transmitting an uplink signal the UE can use Cat 2 LBT to determine whether a channel is idle; and the UE can switch a preset Cat 4 LBT to Cat 2 LBT within the COT to reduce the overhead.

SUMMARY

Inventors find through researches that the directional LBT technique is good for improving the spectrum multiplexing efficiency and transmission performance of an NR system that works on Unlicensed Spectrum. Different from all-directional LBT, the directional LBT, once succeeded, can only support signal transmission in a beam direction of LBT success, while the signal transmission in the direction in which directional LBT is not performed or no directional LBT is successful will be restricted. Therefore, under the circumstance of directional LBT, what relationship exists between the type of LBT employed by the UE and a beam direction of uplink signal transmission is an issue that remains to be solved. Due to the uncertainty of the result of LBT, neither the gNB nor the UE can anticipate to which beams the directional LBT corresponds will be successful before the LBT is finished. As for CSI measurement, since the CSI-RS or SSB is transmitted via a specific beam, the gNB and the UE are unable to predict which CSI-RS or SSB can be transmitted or measured before the end of LBT, if there is no solution to this issue, the measurement of the CSI cannot be accomplished.

To address the above problem, the present application provides a solution. It should be noted that although the statement above only takes the scenario of air-interface transmissions between a cellular network gNB and a UE, the present application is also applicable to other communication scenarios such as WLAN and UE-UE sidelink transmissions, where similar technical effects can be achieved. Additionally, the adoption of a unified solution for various scenarios, including but not limited to cellular networks, WLAN and sidelink transmissions, contributes to the reduction of hardcore complexity and costs. In the case of no conflict, the embodiments of a first node and the characteristics in the embodiments may be applied to a second node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling and a second signaling; and performing a first channel sensing operation on a first sub-band; and transmitting a first radio signal in a first time-frequency resource group on the first sub-band, or, dropping transmitting a first radio signal in a first time-frequency resource group on the first sub-band;

herein, the first signaling is used to determine a first reference signal resource group, the first signaling being non-unicast; the second signaling indicates a second reference signal resource group; when the first time-frequency resource group belongs to a first time window in time domain, the first reference signal resource group and the second reference signal resource group are used together to determine a type of the first channel sensing operation from a first candidate type set, and when the first time-frequency resource group does not belong to the first time window in time domain, the type of the first channel sensing operation is unrelated to the second reference signal resource group; the first candidate type set comprises a first type and a second type.

According to one aspect of the present application, the above method is characterized in that the second signaling indicates the first time-frequency resource group, the first radio signal and the second reference signal resource group being spatially correlated.

In one embodiment, characteristics of the above method include: the first time window is a duration of COT, where the COT is determined by the second node in the present application after the success of the second channel sensing operation. The first signaling is transmitted after the start of COT, and the first reference signal resource group is used to determine a beam direction of a successful LBT corresponding to the COT, and the second reference signal resource group is used to determine a beam direction of the first radio signal; the first candidate type set comprises Cat 2 LBT and Cat 4 LBT; when the first radio signal is within the COT, the type of the first channel sensing operation is related to the beam direction of the first radio signal and the beam direction of a successful LBT corresponding to the COT; when the first radio signal is within the COT, the type of the first channel sensing operation is unrelated to the beam direction of the first radio signal.

In one embodiment, an advantage of the above method includes: the first signaling transmitted by non-unicast indicates a first reference signal resource group, the first reference signal resource group being used to determine the beam direction of a successful LBT corresponding to the COT, of which the signaling overhead is smaller; and, the first node determines the type of LBT according to the first reference signal resource group and the second reference signal resource group, which can avoid the loss of transmission opportunity due to an erroneous choice of the LBT type, and also can avoid the usage of undesirable LBT type in the beam direction in which LBT is unsuccessful.

According to one aspect of the present application, the above method is characterized in further comprising:

receiving a third signaling before receiving the second signaling, the third signaling indicating a third reference signal resource group; and transmitting a fourth signaling, the fourth signaling being used to determine whether the second signaling is correctly received;

herein, when a time interval between the first time-frequency resource group and the fourth signaling is smaller than a first threshold, the third reference signal resource group is used to determine a spatial parameter of the first radio signal; when a time interval between the first time-frequency resource group and the fourth signaling is no smaller than the first threshold and the first time-frequency resource group belongs to the first time window in time domain, the third reference signal resource group is used to determine a spatial parameter of the first radio signal; when a time interval between the first time-frequency resource group and the fourth signaling is no smaller than the first threshold and the first time-frequency resource group does not belong to the first time window in time domain, the second reference signal resource group is used to determine a spatial parameter of the first radio signal.

In one embodiment, characteristics of the above method include: the first radio signal is a periodic signal, and the third signaling is used to determine a beam of the periodic signal; for the sake of mobility, the beam of the periodic signal may need to be updated after some time; the second signaling is used for updating the beam of the periodic signal; the first threshold is a signal process delay.

In one embodiment, an advantage of the above method includes: when a time interval between the first time-frequency resource group and the fourth signaling is larger than a signal process delay and the first time-frequency resource group is within the COT, if a new beam indicated by the second signaling is not spatially correlated with the beam direction of a successful LBT corresponding to the COT, the new beam indicated by the second signaling is not used, instead, the old beam indicated by the third signaling will continue to be used, which helps increase the transmission opportunity of the first node within the COT.

According to one aspect of the present application, the above method is characterized in that when the first time-frequency resource group belongs to the first time window in time domain, and the first reference signal resource group and the second reference signal resource group are spatially correlated, the type of the first channel sensing operation is determined to be a second type.

According to one aspect of the present application, the above method is characterized in that before receiving the first signaling, the type of the first channel sensing operation is determined to be a first type; when the first time-frequency resource group belongs to a first time window in time domain, and the first reference signal resource group and the second reference signal resource group are spatially correlated, the type of the first channel sensing operation is switched from the first type to the second type.

According to one aspect of the present application, the above method is characterized in further comprising: receiving a fifth signaling; herein, the fifth signaling comprises an indication of transmitting the first radio signal; when the first time-frequency resource group belongs to a first time window in time domain, and the first reference signal resource group and the second reference signal resource group are not spatially correlated, the indication of transmitting the first radio signal is used to determine whether the first radio signal is allowed to be transmitted.

In one embodiment, an advantage of the above method includes: when the first time-frequency resource group is within the COT, and a beam direction of the first radio signal is not spatially correlated with a beam direction of a successful LBT corresponding to the COT, the fifth signaling is used to determine whether the first radio signal is allowed to be transmitted. For instance, when the second node can receive a signal in a beam direction of the first radio signal, the first radio signal is allowed to be transmitted; otherwise, it is not allowed to transmit the first radio signal. If a first radio signal is allowed to be transmitted, Cat 4 LBT is required to be performed before transmitting the first radio signal. With the method, under the circumstance that a beam direction of the first radio signal is different from that of successful LBT corresponding to the COT, whether the first radio signal is transmitted can be controlled flexibly to the benefit of enhanced scheduling flexibility and system performance.

According to one aspect of the present application, the above method is characterized in that when the first time-frequency resource group belongs to the first time window in time domain, a channel access priority of the first radio signal is used to determine the type of the first channel sensing operation.

The present application provides a method in a second node for wireless communications, comprising:

transmitting a first signaling and a second signaling; and performing a second channel sensing operation on a first sub-band; and performing a first detecting operation on a first time-frequency resource group on the first sub-band, the first detecting operation being used to determine whether a first radio signal is received on the first time-frequency resource group;

herein, the first signaling is used to determine a first reference signal resource group, the first signaling being non-unicast; the second signaling indicates a second reference signal resource group; the second channel sensing operation is used to determine a first time window; a first channel sensing operation is used to determine whether the first radio signal is transmitted, where a performer of the first channel sensing operation is a receiver for the second signaling; when the first time-frequency resource group belongs to a first time window in time domain, the first reference signal resource group and the second reference signal resource group are used together to determine a type of the first channel sensing operation from a first candidate type set, when the first time-frequency resource group does not belong to the first time window in time domain, the type of the first channel sensing operation is unrelated to the second reference signal resource group; the first candidate type set comprises a first type and a second type.

According to one aspect of the present application, the above method is characterized in that the second signaling indicates the first time-frequency resource group, the first radio signal and the second reference signal resource group being spatially correlated.

According to one aspect of the present application, the above method is characterized in further comprising:

transmitting a third signaling before receiving the second signaling, the third signaling indicating a third reference signal resource group; and receiving a fourth signaling, the fourth signaling being used to determine whether the second signaling is correctly received;

herein, when a time interval between the first time-frequency resource group and the fourth signaling is smaller than a first threshold, the third reference signal resource group is used to determine a spatial parameter of the first radio signal; when a time interval between the first time-frequency resource group and the fourth signaling is no smaller than the first threshold and the first time-frequency resource group belongs to the first time window in time domain, the third reference signal resource group is used to determine a spatial parameter of the first radio signal; when a time interval between the first time-frequency resource group and the fourth signaling is no smaller than the first threshold and the first time-frequency resource group does not belong to the first time window in time domain, the second reference signal resource group is used to determine a spatial parameter of the first radio signal.

According to one aspect of the present application, the above method is characterized in that when the first time-frequency resource group belongs to the first time window in time domain, and the first reference signal resource group and the second reference signal resource group are spatially correlated, the type of the first channel sensing operation is determined to be a second type.

According to one aspect of the present application, the above method is characterized in that before transmitting the first signaling, the type of the first channel sensing operation is determined to be a first type; when the first time-frequency resource group belongs to a first time window in time domain, and the first reference signal resource group and the second reference signal resource group are spatially correlated, the type of the first channel sensing operation is switched from the first type to the second type.

According to one aspect of the present application, the above method is characterized in further comprising: transmitting a fifth signaling; herein, the fifth signaling comprises an indication of transmitting the first radio signal; when the first time-frequency resource group belongs to a first time window in time domain, and the first reference signal resource group and the second reference signal resource group are not spatially correlated, the indication of transmitting the first radio signal is used to determine whether the first radio signal is allowed to be transmitted.

According to one aspect of the present application, the above method is characterized in that when the first time-frequency resource group belongs to the first time window in time domain, a channel access priority of the first radio signal is used to determine the type of the first channel sensing operation.

The present application provides a first node for wireless communications, comprising:

a first receiver, receiving a first signaling and a second signaling;

a second receiver, performing a first channel sensing operation on a first sub-band; and a first transmitter, transmitting a first radio signal in a first time-frequency resource group on the first sub-band, or, dropping transmitting a first radio signal in a first time-frequency resource group on the first sub-band;

herein, the first signaling is used to determine a first reference signal resource group, the first signaling being non-unicast; the second signaling indicates a second reference signal resource group; when the first time-frequency resource group belongs to a first time window in time domain, the first reference signal resource group and the second reference signal resource group are used together to determine a type of the first channel sensing operation from a first candidate type set, and when the first time-frequency resource group does not belong to the first time window in time domain, the type of the first channel sensing operation is unrelated to the second reference signal resource group; the first candidate type set comprises a first type and a second type.

The present application provides a second node for wireless communications, comprising:

a second transmitter, transmitting a first signaling and a second signaling;

a third receiver, performing a second channel sensing operation on a first sub-band; and a fourth receiver, performing a first detecting operation on a first time-frequency resource group on the first sub-band, the first detecting operation being used to determine whether a first radio signal is received on the first time-frequency resource group;

herein, the first signaling is used to determine a first reference signal resource group, the first signaling being non-unicast; the second signaling indicates a second reference signal resource group; the second channel sensing operation is used to determine a first time window; a first channel sensing operation is used to determine whether the first radio signal is transmitted, where a performer of the first channel sensing operation is a receiver for the second signaling; when the first time-frequency resource group belongs to a first time window in time domain, the first reference signal resource group and the second reference signal resource group are used together to determine a type of the first channel sensing operation from a first candidate type set, when the first time-frequency resource group does not belong to the first time window in time domain, the type of the first channel sensing operation is unrelated to the second reference signal resource group; the first candidate type set comprises a first type and a second type.

The present application provides a method in a first node for wireless communications, comprising:

receiving a first signaling; and receiving a second signaling;

transmitting a first information block;

herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, characteristics of the above method include: the first spatial configuration information is transmitted after the success of LBT, where the first spatial configuration information is used to determine an applicable beam. Among the Q1 reference signals, only when a beam direction associated with a reference signal is the same as an applicable beam direction determined by the first spatial configuration information will the former be used for CSI measurement.

In one embodiment, an advantage of the above method includes: the first node can determine according to the first spatial configuration information and the first configuration information on which reference signals the measurement needs to be performed.

According to one aspect of the present application, the above method is characterized in that a number of bits comprised in the first information block is related to a number of reference signals comprised in the first reference signal subset.

In one embodiment, an advantage of the above method includes: feedback information sent from the first node only needs to reflect the result of measuring the first reference signal subset and does not have to contain the entire measurement results of Q1 reference signals, hence conservation of the feedback overhead.

According to one aspect of the present application, the above method is characterized in that the first spatial configuration information is used to determine multiple candidate spatial parameters; a spatial parameter associated with any said reference signal in the first reference signal subset is one of the multiple candidate spatial parameters.

According to one aspect of the present application, the above method is characterized in receiving first time configuration information, the first time configuration information being used to determine a first time window, the first spatial configuration information being valid within the first time window.

According to one aspect of the present application, the above method is characterized in that the first spatial configuration information is related to a spatial parameter of a first channel sensing operation, the first channel sensing operation being used to determine whether a radio signal can be transmitted on a first sub-band, frequency-domain resources occupied by the second signaling belonging to the first sub-band.

According to one aspect of the present application, the above method is characterized in that any reference signal of the Q1 reference signals that does not belong to the first reference signal subset is not transmitted within the first time window.

In one embodiment, an advantage of the above method includes: any reference signal not belonging to the first reference signal subset is not transmitted, so that time-frequency resources occupied by the untransmitted reference signals can be used by other signals or channels, thus increasing the utilization ratio of the spectrum.

According to one aspect of the present application, the above method is characterized in that the first spatial configuration information is used to determine a transmit parameter of the first information block.

In one embodiment, the essence of the above method includes: the first information block can only be transmitted using a beam on which LBT is successful, and a transmitting beam for the first information block is determined by the first spatial configuration information.

In one embodiment, an advantage of the above method includes: the first node and the second node determine a transmit parameter of the first information block according to the first spatial configuration information, which enables the first information block to be transmitted and received correctly.

The present application provides a method in a second node for wireless communications, comprising:

transmitting a first signaling; and transmitting a second signaling;

receiving a first information block;

herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

According to one aspect of the present application, the above method is characterized in that a number of bits comprised in the first information block is related to a number of reference signals comprised in the first reference signal subset.

According to one aspect of the present application, the above method is characterized in that the first spatial configuration information is used to determine multiple candidate spatial parameters; a spatial parameter associated with any said reference signal in the first reference signal subset is one of the multiple candidate spatial parameters.

According to one aspect of the present application, the above method is characterized in transmitting first time configuration information, the first time configuration information being used to determine a first time window, the first spatial configuration information being valid within the first time window.

According to one aspect of the present application, the above method is characterized in that the first spatial configuration information is related to a spatial parameter of a first channel sensing operation, the first channel sensing operation being used to determine whether a radio signal can be transmitted on a first sub-band, frequency-domain resources occupied by the second signaling belonging to the first sub-band.

According to one aspect of the present application, the above method is characterized in that the second node does not transmit any reference signal of the Q1 reference signals that does not belong to the first reference signal subset within the first time window.

According to one aspect of the present application, the above method is characterized in that the first spatial configuration information is used to determine a transmit parameter of the first information block.

The present application provides a first node for wireless communications, comprising:

a first receiver, receiving a first signaling;

a second receiver, receiving a second signaling; and a first transmitter, transmitting a first information block;

herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

The present application provides a second node for wireless communications, comprising:

a second transmitter, transmitting a first signaling;

a third transmitter, transmitting a second signaling; and a third receiver, receiving a first information block;

herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, the present application has the following advantages:

within a COT, the UE can determine a LBT type of an uplink transmission according to a first reference signal resource group and a second reference signal resource group. when a beam direction of the first radio signal and a beam direction of a successful LBT corresponding to the COT are correlated, the UE can switch a first channel sensing operation from Cat 4 LBT to Cat 2 LBT, thus reducing the time overhead of LBT and enhancing the transmission opportunity.

within a COT, if a new beam indicated by an uplink transmission is not linked with a beam direction of a successful LBT corresponding to the COT, the new beam can be postponed till the COT ends and restarted, thus increasing the transmission opportunity within the COT.

in a case that a beam direction of the first radio signal is different from that of successful LBT corresponding to the COT, an indication for transmitting the first radio signal is used for determining whether the first radio signal can be transmitted after the success of Cat 4 LBT, which can enhance the scheduling flexibility and system performance.

In one embodiment, the present application has the following advantages:

the first node can determine an applicable beam in Channel Occupancy Time (COT) by the second signaling, and then select each reference signal in need of measuring from multiple reference signals notified by a first signaling according to the applicable beam, thus, the measurement and feedback of reference signals can be kept from uncertainty caused by directional LBT.

the CSI feedback only needs to reflect a result of measuring the first reference signal subset, thus reducing the feedback overhead compared with the technique of feedback of the result of measuring Q1 reference signals.

any reference signal not belonging to the first reference signal subset is not transmitted, so that time-frequency resources occupied by the untransmitted reference signals can be used by other signals, thus increasing the utilization ratio of the spectrum.

the first node determines a transmitting beam of the first information block according to the first spatial configuration information, which enables the first information block to be transmitted and received correctly, thus avoiding uncertainty of transmitting beam caused by directional LBT.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figures 1A, 1B, 2:
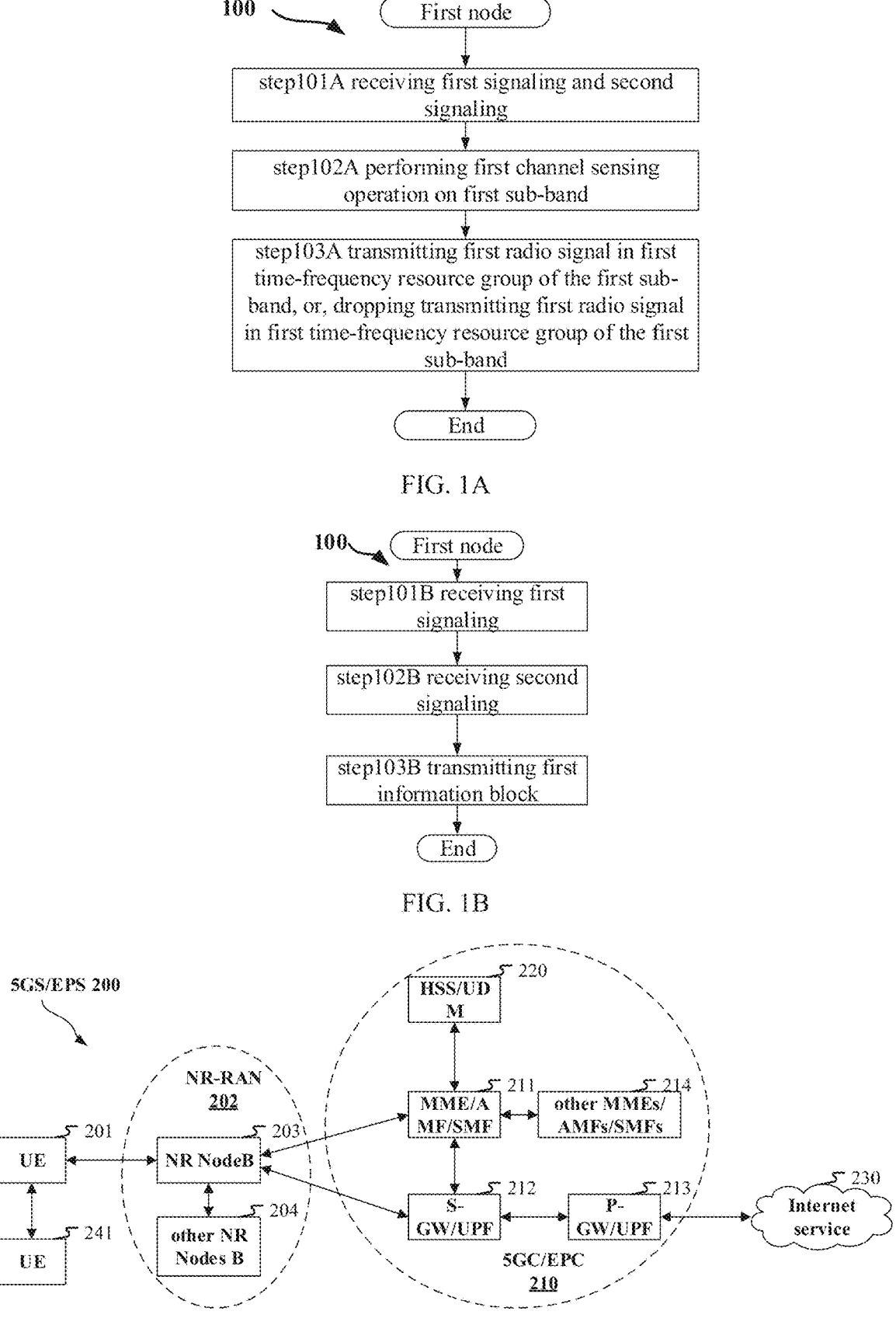
FIG. 1A illustrates a flowchart of processing of a first node according to one embodiment of the present application.
FIG. 1B illustrates a flowchart of processing of a first node according to one embodiment of the present application.
FIG. 2 illustrates a schematic diagram of a network architecture according to one embodiment of the present application.

Embodiment 1A illustrates a flowchart of processing of a first node according to one embodiment of the present application, as shown in FIG. 1A. In FIG. 1A, each box represents a step. Particularly, the sequential step arrangement in each box herein does not imply a chronological order of steps marked respectively by these boxes. In Embodiment 1A, the first node in the present application receives a first signaling and a second signaling in step S101A; and performs a first channel sensing operation on a first sub-band in step 102A; and, in step 103A, transmits a first radio signal in a first time-frequency resource group on the first sub-band, or, dropping transmitting a first radio signal in a first time-frequency resource group on the first sub-band. In Embodiment 1A, the first signaling is used to determine a first reference signal resource group, the first signaling being non-unicast; the second signaling indicates a second reference signal resource group; when the first time-frequency resource group belongs to a first time window in time domain, the first reference signal resource group and the second reference signal resource group are used together to determine a type of the first channel sensing operation from a first candidate type set, and when the first time-frequency resource group does not belong to the first time window in time domain, the type of the first channel sensing operation is unrelated to the second reference signal resource group; the first candidate type set comprises a first type and a second type.

In one embodiment, the first signaling is a dynamic signaling.

In one embodiment, the first signaling is a layer 1 (L1) signaling.

In one embodiment, the first signaling is a layer 1 (L1) control signaling.

In one embodiment, the first signaling does not comprise any reference signal.

In one embodiment, the first signaling comprises a reference signal.

In one embodiment, the first signaling is Cell-Specific.

In one embodiment, the first signaling is User Group-Specific.

In one embodiment, the first signaling is Group Common.

In one embodiment, the first signaling comprises all or part of a Higher Layer signaling.

In one embodiment, the first signaling comprises all or part of an RRC layer signaling.

In one embodiment, the first signaling comprises one or more fields in an RRC IE.

In one embodiment, the first signaling comprises one or more fields in a SIB.

In one embodiment, the first signaling comprises all or part of a MAC layer signaling.

In one embodiment, the first signaling comprises one or more fields in a MAC CE.

In one embodiment, the first signaling comprises one or more fields in a PHY layer signaling.

In one embodiment, the first signaling is semi-statically configured.

In one embodiment, the first signaling is dynamically configured.

In one embodiment, the first signaling is transmitted in SideLink.

In one embodiment, the first signaling is transmitted in UpLink.

In one embodiment, the first signaling is transmitted in DownLink.

In one embodiment, the first signaling is transmitted in Backhaul.

In one embodiment, the first signaling is transmitted via a Uu interface.

In one embodiment, the first signaling is transmitted via a PC5 interface.

In one embodiment, the first signaling is transmitted by Groupcast.

In one embodiment, the first signaling is transmitted by Broadcast.

In one embodiment, the first signaling comprises Sidelink Control Information (SCI).

In one embodiment, the first signaling comprises one or more fields in an SCI.

In one embodiment, the first signaling comprises one or more fields in an SCI format.

In one embodiment, the first signaling comprises Uplink control information (UCI).

In one embodiment, the first signaling comprises one or more fields in a UCI.

In one embodiment, the first signaling comprises one or more fields in a UCI format.

In one embodiment, the first signaling comprises Downlink Control Information (DCI).

In one embodiment, the first signaling comprises one or more fields in a DCI.

In one embodiment, the first signaling comprises one or more fields in a DCI format.

In one embodiment, the first signaling comprises one or more fields in a Group Common DCI, where the definition of the Group Common DCI can be found in 3GPP TS38.212.

In one embodiment, the first signaling comprises one or more fields in a DCI format 2_0, where the definition of the DCI format 2_0 can be found in 3GPP TS38.212.

In one embodiment, the first signaling is transmitted on a Physical Uplink Shared Channel (PUSCH).

In one embodiment, the first signaling is transmitted on a Physical Uplink Control Channel (PUCCH).

In one embodiment, the first signaling is transmitted on a Physical Downlink Shared Channel (PDSCH).

In one embodiment, the first signaling is transmitted on a Physical Downlink Control Channel (PDCCH).

In one embodiment, the first signaling is transmitted on a Physical Broadcast Channel (PBCH).

In one embodiment, the first signaling is transmitted on a Physical Sidelink Control Channel (PSCCH).

In one embodiment, the first signaling is transmitted on a Physical Sidelink Shared Channel (PSSCH).

In one embodiment, the first signaling is transmitted in Licensed Spectrum.

In one embodiment, the first signaling is transmitted in Unlicensed Spectrum.

In one embodiment, the second signaling is a dynamic signaling.

In one embodiment, the second signaling is a layer 1 (L1) signaling.

In one embodiment, the second signaling is a layer 1 (L1) control signaling.

In one embodiment, the second signaling does not comprise any reference signal.

In one embodiment, the second signaling comprises a reference signal.

In one embodiment, the second signaling is Cell-Specific.

In one embodiment, the second signaling is User Group-Specific.

In one embodiment, the second signaling is Group Common.

In one embodiment, the second signaling comprises all or part of a Higher Layer signaling.

In one embodiment, the second signaling comprises all or part of an RRC layer signaling.

In one embodiment, the second signaling comprises one or more fields in an RRC IE.

In one embodiment, the second signaling comprises one or more fields in a SIB.

In one embodiment, the second signaling comprises all or part of a MAC layer signaling.

In one embodiment, the second signaling comprises one or more fields in a MAC CE.

In one embodiment, the second signaling comprises one or more fields in a PHY layer signaling.

In one embodiment, the second signaling is semi-statically configured.

In one embodiment, the second signaling is dynamically configured.

In one embodiment, the second signaling is transmitted in SideLink.

In one embodiment, the second signaling is transmitted in UpLink.

In one embodiment, the second signaling is transmitted in DownLink.

In one embodiment, the second signaling is transmitted in Backhaul.

In one embodiment, the second signaling is transmitted via a Uu interface.

In one embodiment, the second signaling is transmitted via a PC5 interface.

In one embodiment, the second signaling is transmitted by Groupcast.

In one embodiment, the second signaling is transmitted by Broadcast.

In one embodiment, the second signaling comprises Sidelink Control Information (SCI).

In one embodiment, the second signaling comprises one or more fields in an SCI.

In one embodiment, the second signaling comprises one or more fields in an SCI format.

In one embodiment, the second signaling comprises Uplink control information (UCI).

In one embodiment, the second signaling comprises one or more fields in a UCI.

In one embodiment, the second signaling comprises one or more fields in a UCI format.

In one embodiment, the second signaling comprises Downlink Control Information (DCI).

In one embodiment, the second signaling comprises one or more fields in a DCI.

In one embodiment, the second signaling comprises one or more fields in a DCI format.

In one embodiment, the second signaling is transmitted on a Physical Uplink Shared Channel (PUSCH).

In one embodiment, the second signaling is transmitted on a Physical Uplink Control Channel (PUCCH).

In one embodiment, the second signaling is transmitted on a Physical Downlink Shared Channel (PDSCH).

In one embodiment, the second signaling is transmitted on a Physical Downlink Control Channel (PDCCH).

In one embodiment, the second signaling is transmitted on a Physical Broadcast Channel (PBCH).

In one embodiment, the second signaling is transmitted on a Physical Sidelink Control Channel (PSCCH).

In one embodiment, the second signaling is transmitted on a Physical Sidelink Shared Channel (PSSCH).

In one embodiment, the second signaling is transmitted in Licensed Spectrum.

In one embodiment, the second signaling is transmitted in Unlicensed Spectrum.

In one embodiment, the second signaling comprises information indicating PUSCH resources.

In one embodiment, the second signaling comprises information indicating PUCCH resources.

In one embodiment, the second signaling comprises information indicating Sounding Reference Signal (SRS) resources.

In one embodiment, the second signaling comprises information for dynamic scheduling of PUSCH.

In one embodiment, the second signaling comprises information for semi-persistent scheduling of PUSCH.

In one embodiment, the second signaling comprises information for Configured Grant of PUSCH.

In one embodiment, the second signaling comprises a periodic indication of PUCCH.

In one embodiment, the second signaling comprises a periodic indication of SRS.

In one embodiment, the second signaling indicates the first time-frequency resource group.

In one embodiment, the first radio signal comprises a baseband signal.

In one embodiment, the first radio signal comprises a radio signal.

In one embodiment, the first radio signal is transmitted in SideLink.

In one embodiment, the first radio signal is transmitted in UpLink.

In one embodiment, the first radio signal is transmitted in DownLink.

In one embodiment, the first radio signal is transmitted in Backhaul.

In one embodiment, the first radio signal is transmitted via a Uu interface.

In one embodiment, the first radio signal is transmitted via a PC5 interface.

In one embodiment, the first radio signal is transmitted by Unicast.

In one embodiment, the first radio signal is transmitted by Groupcast.

In one embodiment, the first radio signal is transmitted by Broadcast.

In one embodiment, the first radio signal carries a Transport Block (TB).

In one embodiment, the first radio signal carries a Code Block (CB).

In one embodiment, the first radio signal carries a Code Block Group (CBG).

In one embodiment, the first radio signal comprises control information.

In one embodiment, the first radio signal comprises Sidelink Control Information (SCI).

In one embodiment, the first radio signal comprises one or more fields in an SCI.

In one embodiment, the first radio signal comprises one or more fields in an SCI format.

In one embodiment, the first radio signal comprises Uplink control information (UCI).

In one embodiment, the first radio signal comprises one or more fields in a UCI.

In one embodiment, the first radio signal comprises one or more fields in a UCI format.

In one embodiment, the first radio signal comprises Downlink Control Information (DCI).

In one embodiment, the first radio signal comprises one or more fields in a DCI.

In one embodiment, the first radio signal comprises one or more fields in a DCI format.

In one embodiment, the first radio signal comprises a Physical Uplink Shared Channel (PUSCH).

In one embodiment, the first radio signal comprises a Physical Uplink Control Channel (PUCCH).

In one embodiment, the first radio signal comprises a Physical Downlink Shared Channel (PDSCH).

In one embodiment, the first radio signal comprises a Physical Downlink Control Channel (PDCCH).

In one embodiment, the first radio signal comprises a Physical Broadcast Channel (PBCH).

In one embodiment, the first radio signal comprises a Physical Sidelink Control Channel (PSCCH).

In one embodiment, the first radio signal comprises a Physical Sidelink Shared Channel (PSSCH).

In one embodiment, the first radio signal comprises a Physical Sidelink Feedback Channel (PSFCH).

In one embodiment, the first radio signal comprises a reference signal.

In one embodiment, the first radio signal is transmitted in Licensed Spectrum.

In one embodiment, the first radio signal is transmitted in Unlicensed Spectrum.

In one embodiment, the first radio signal comprises a reference signal.

In one embodiment, the first radio signal comprises an uplink reference signal.

In one embodiment, the first radio signal comprises a sidelink reference signal.

In one embodiment, the first radio signal comprises a downlink reference signal.

In one embodiment, the first radio signal comprises an SRS.

In one embodiment, the first radio signal comprises an uplink signal with Configured Grant.

In one embodiment, the first radio signal comprises a dynamically scheduled uplink signal.

In one embodiment, the first radio signal comprises a semi-persistently scheduled uplink signal.

In one embodiment, the first radio signal comprises a PUSCH with Configured Grant.

In one embodiment, the first radio signal comprises a dynamically scheduled PUSCH.

In one embodiment, the first radio signal comprises a semi-persistently scheduled PUSCH.

In one embodiment, the first signaling indicates the first reference signal resource group.

In one embodiment, the first signaling comprises a first information field, the first information field indicating the first reference signal resource group.

In one embodiment, a spatial parameter used for transmitting the first signaling is used to determine the first reference signal resource group.

In one embodiment, a TCI state used for transmitting the first signaling is used to determine the first reference signal resource group.

In one embodiment, a QCL parameter used for transmitting the first signaling is used to determine the first reference signal resource group.

In one embodiment, the first signaling and the first reference signal resource group are spatially correlated.

In one embodiment, the first signaling is transmitted by a PDCCH, and the first reference signal resource group is one or more reference signal resources associated with a TCI state of a PDCCH used for transmitting the first signaling.

In one embodiment, the first signaling is transmitted by a PDCCH, and the first reference signal resource group is one or more reference signal resources associated with a QCL parameter of a PDCCH used for transmitting the first signaling.

In one embodiment, the first reference signal resource group comprises one reference signal resource.

In one embodiment, the first reference signal resource group comprises multiple reference signal resources.

In one embodiment, any reference signal resource in the first reference signal resource group comprises a downlink reference signal resource.

In one embodiment, any reference signal resource in the first reference signal resource group comprises an uplink reference signal resource.

In one embodiment, any reference signal resource in the first reference signal resource group comprises a sidelink reference signal resource.

In one embodiment, any reference signal resource in the first reference signal resource group comprises a Channel State Information-Reference Signal (CSI-RS) resource.

In one embodiment, any reference signal resource in the first reference signal resource group comprises a Synchronization Signal (SS).

In one embodiment, any reference signal resource in the first reference signal resource group comprises a Primary Synchronization Signal (PSS).

In one embodiment, any reference signal resource in the first reference signal resource group comprises a Secondary Synchronization Signal (SSS).

In one embodiment, any reference signal resource in the first reference signal resource group comprises a SS/PBCH block (SSB).

In one embodiment, any reference signal resource in the first reference signal resource group comprises an SRS resource.

In one embodiment, any reference signal resource in the first reference signal resource group comprises an SRS resource set.

In one embodiment, any reference signal resource in the first reference signal resource group comprises a DeModulation-Reference Signal (DM-RS).

In one embodiment, the first reference signal resource group is used to determine a beam direction in which it is determined that the channel is idle in the second channel sensing operation.

In one embodiment, the first reference signal resource group is used to determine an applicable spatial parameter set in the first time window.

In one embodiment, the first reference signal resource group is used to determine an applicable spatial parameter set for downlink transmission in the first time window.

In one embodiment, the first reference signal resource group is used to determine an applicable spatial parameter set for uplink transmission in the first time window.

In one subembodiment, the applicable spatial parameter set comprises a spatial correlation with a reference signal resource.

In one subembodiment, the applicable spatial parameter set comprises at least one spatial parameter, where all spatial parameters for downlink transmission within the first time window belong to the applicable spatial parameter set.

In one subembodiment, the applicable spatial parameter set comprises at least one spatial parameter, if a second radio signal is transmitted within the first time window, a spatial parameter of the second radio signal belongs to the applicable spatial parameter set.

In one subembodiment, the second radio signal comprises a downlink signal.

In one subembodiment, the second radio signal comprises an uplink signal.

In one subembodiment, the spatial parameter comprises a spatial correlation with a reference signal resource.

In one embodiment, the second reference signal resource group comprises one reference signal resource.

In one embodiment, the second reference signal resource group comprises multiple reference signal resources.

In one embodiment, any reference signal resource in the second reference signal resource group comprises a downlink reference signal resource.

In one embodiment, any reference signal resource in the second reference signal resource group comprises an uplink reference signal resource.

In one embodiment, any reference signal resource in the second reference signal resource group comprises a sidelink reference signal resource.

In one embodiment, any reference signal resource in the second reference signal resource group comprises a Channel State Information-Reference Signal (CSI-RS) resource.

In one embodiment, any reference signal resource in the second reference signal resource group comprises a Synchronization Signal (SS).

In one embodiment, any reference signal resource in the second reference signal resource group comprises a Primary Synchronization Signal (PSS).

In one embodiment, any reference signal resource in the second reference signal resource group comprises a Secondary Synchronization Signal (SSS).

In one embodiment, any reference signal resource in the second reference signal resource group comprises a SS/PBCH block (SSB).

In one embodiment, any reference signal resource in the second reference signal resource group comprises an SRS resource.

In one embodiment, any reference signal resource in the second reference signal resource group comprises an SRS resource set.

In one embodiment, any reference signal resource in the second reference signal resource group comprises a DeModulation-Reference Signal (DM-RS).

In one embodiment, the spatial parameter in the present application comprises a spatial correlation with a reference signal resource.

In one embodiment, the spatial parameter in the present application comprises a QCL parameter.

In one embodiment, the spatial parameter in the present application comprises a Spatial Relation.

In one embodiment, the spatial parameter in the present application comprises a Spatial Transmission Filter.

In one embodiment, the spatial parameter in the present application comprises a Spatial Reception Filter.

In one embodiment, the first radio signal and the second reference signal resource group are spatially correlated.

In one embodiment, the first radio signal and any reference signal resource in the second reference signal resource group are spatially correlated.

In one embodiment, the first radio signal and any reference signal resource in the second reference signal resource group being spatially correlated includes that there is a Quasi-CoLocated (QCL) correlation between the first radio signal and any reference signal resource in the second reference signal resource group.

In one embodiment, the first radio signal and any reference signal resource in the second reference signal resource group being spatially correlated includes that there is a spatial relation between the first radio signal and any reference signal resource in the second reference signal resource group, for the definition of the spatial relation, refer to 3 gpp TS38.213.

In one embodiment, a signal being spatially related to another signal includes that the signal and the other signal can be transmitted using a same spatial filter.

In one embodiment, a signal being spatially related to another signal includes that the signal and the other signal can be received using a same spatial filter.

In one embodiment, a signal being spatially related to another signal includes that a spatial filter used to receive the signal can also be used for transmitting the other signal.

In one embodiment, the first radio signal and any reference signal resource in the second reference signal resource group being spatially correlated includes that there is a Quasi-CoLocated (QCL) correlation between a reference signal comprised in the first radio signal and any reference signal resource in the second reference signal resource group.

In one embodiment, the first radio signal and any reference signal resource in the second reference signal resource group being spatially correlated includes that there is a spatial relation between a reference signal comprised in the first radio signal and any reference signal resource in the second reference signal resource group.

In one embodiment, the specific definition of the QCL can be found in 3GPP TS38.214, Section 5.1.5.

In one embodiment, the QCL correlation between a signal and another signal means that all or partial large-scale properties of a radio signal transmitted on an antenna port corresponding to the signal can be inferred from all or partial large-scale properties of a radio signal transmitted on an antenna port corresponding to the other signal.

In one embodiment, large-scale properties of a radio signal include one or more of a delay spread, a Doppler spread, a Doppler shift, a path loss, an average gain, an average delay or Spatial Rx parameters.

In one embodiment, the Spatial Rx parameters comprise one or more of a receiving beam, a reception analog beamforming matrix, a reception analog beamforming vector, a reception beamforming vector, a reception spatial filter or a spatial domain reception filter.

In one embodiment, the QCL correlation between a signal and another signal means that the signal and the other signal at least have one same QCL parameter.

In one embodiment, QCL parameters include one or more of a delay spread, a Doppler spread, a Doppler shift, a path loss, an average gain, an average delay or Spatial Rx parameters.

In one embodiment, the QCL correlation between a signal and another signal means that at least one QCL parameter of the signal can be inferred from at least one QCL parameter of the other signal.

In one embodiment, the QCL type between a signal and another signal being QCL-TypeD means that Spatial Rx parameters of a radio signal transmitted on an antenna port corresponding to the signal can be inferred from Spatial Rx parameters of a radio signal transmitted on an antenna port corresponding to the other signal.

In one embodiment, the QCL type between a signal and another signal being QCL-TypeD means that the same Spatial Rx parameters can be used to receive the signal and the other signal.

In one embodiment, performing a first channel sensing operation on the first sub-band includes performing energy detection on the first sub-band.

In one embodiment, the first channel sensing operation is used to determine whether the first radio signal is transmitted.

In one embodiment, the first channel sensing operation is used to determine whether the first sub-band is idle.

In one embodiment, the first channel sensing operation is used to determine whether the first sub-band is idle, if the first sub-band is idle, the first radio signal is transmitted; if the first sub-band is non-idle, the first radio signal is not transmitted.

In one embodiment, the first candidate type set comprises at least one of Category 1 LBT, Category 2 LBT, Category 3 LBT or Category 4 LBT; the definitions of the Category 1 LBT, the Category 2 LBT, the Category 3 LBT and the Category 4 LBT are given in 3GPP TR38.889.

In one embodiment, the first candidate type set comprises at least one of a Type 1 UL channel access procedure, a Type2 UL channel access procedure, a Type 2A UL channel access procedure, a Type 2B UL channel access procedure or a Type 2C UL channel access procedure; the definitions of the Type 1 UL channel access procedure, Type2 UL channel access procedure, Type 2A UL channel access procedure, Type 2B UL channel access procedure and Type 2C UL channel access procedure are given in 3GPP TS37.213.

In one embodiment, the first candidate type set comprises at least one of a Type 1 DL channel access procedure, a Type2 DL channel access procedure, a Type 2A DL channel access procedure, a Type 2B DL channel access procedure or a Type 2C DL channel access procedure; the definitions of the Type 1 DL channel access procedure, Type2 DL channel access procedure, Type 2A DL channel access procedure, Type 2B DL channel access procedure and Type 2C DL channel access procedure are given in 3GPP TS37.213.

In one embodiment, the second type includes LBT with a fixed time length.

In one embodiment, the first type includes LBT with a non-fixed time length.

In one embodiment, the second type includes Cat 2 LBT.

In one embodiment, the second type includes Cat 1 LBT.

In one embodiment, the first type includes Cat 4 LBT.

In one embodiment, the first time window comprises a segment of contiguous time resources.

In one embodiment, the first time window comprises a positive integer number of consecutive multicarrier symbols.

In one embodiment, the first time window comprises a positive integer number of consecutive slots.

In one embodiment, the first time window comprises a positive integer number of consecutive subframes.

In one embodiment, the first time window comprises a positive integer number of consecutive frames.

In one embodiment, the first time window is determined by the second node in the present application.

In one embodiment, the first time window is determined after the second channel sensing operation by the second node in the present application.

In one embodiment, performing a second channel sensing operation on the first sub-band includes performing energy detection on the first sub-band.

In one embodiment, the type of the second channel sensing operation includes at least one of Category 1 LBT, Category 2 LBT, Category 3 LBT or Category 4 LBT.

In one embodiment, a time length of the first time window is related to a channel access priority.

In one embodiment, the first time-frequency resource group comprises a positive integer number of Resource Element(s) (RE(s)) in frequency domain.

In one embodiment, the first time-frequency resource group comprises a positive integer number of Resource Block(s) (RB(s)) in frequency domain.

In one embodiment, the first time-frequency resource group comprises a positive integer number of Resource Block Group(s) (RBG(s)) in frequency domain.

In one embodiment, the first time-frequency resource group comprises a positive integer number of Control Channel Element(s) (CCE(s)) in frequency domain.

In one embodiment, the first time-frequency resource group comprises a positive integer number of multicarrier symbol(s) in time domain.

In one embodiment, the first time-frequency resource group comprises a positive integer number of slot(s) in time domain.

In one embodiment, the first time-frequency resource group comprises a positive integer number of subframe(s) in time domain.

Embodiment 1B

Embodiment 1B illustrates a flowchart of processing of a first node according to one embodiment of the present application, as shown in FIG. 1B. In FIG. 1B, each box represents a step. Particularly, the sequential step arrangement in each box herein does not imply a chronological order of steps marked respectively by these boxes. In Embodiment 1B, the first node in the present application receives a first signaling in step 101B; receives a second signaling in step 102B; and transmits a first information block in step 103B. In Embodiment 1B, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, the first signaling is a dynamic signaling.

In one embodiment, the first signaling is a layer 1 (L1) signaling.

In one embodiment, the first signaling is a layer 1 (L1) control signaling.

In one embodiment, the first signaling is transmitted in SideLink.

In one embodiment, the first signaling is transmitted via a PC5 interface.

In one embodiment, the first signaling is transmitted in DownLink.

In one embodiment, the first signaling is transmitted via a Uu interface.

In one embodiment, the first signaling is transmitted by Unicast.

In one embodiment, the first signaling is transmitted by Groupcast.

In one embodiment, the first signaling is transmitted by Broadcast.

In one embodiment, the first signaling is Cell-Specific.

In one embodiment, the first signaling is UE-Specific.

In one embodiment, the first signaling comprises all or part of a Higher Layer signaling.

In one embodiment, the first signaling comprises all or part of a Radio Resource Control (RRC) layer signaling.

In one embodiment, the first signaling comprises one or more fields in an RRC Information Element (IE).

In one embodiment, the first signaling comprises one or more fields in a System Informant Block (SIB).

In one embodiment, the first signaling comprises all or part of a MAC layer signaling.

In one embodiment, the first signaling comprises one or more fields in a MAC Control Element (CE).

In one embodiment, the first signaling comprises one or more fields in a Physical (PHY) layer signaling.

In one embodiment, the first signaling comprises Sidelink Control Information (SCI).

In one embodiment, the first signaling comprises one or more fields in an SCI.

In one embodiment, the first signaling comprises one or more fields in an SCI format.

In one embodiment, the first signaling comprises Downlink Control Information (DCI).

In one embodiment, the first signaling comprises one or more fields in a DCI.

In one embodiment, the first signaling is semi-statically configured.

In one embodiment, the first signaling is dynamically configured.

In one embodiment, the first signaling is transmitted on a Physical Downlink Control Channel (PDCCH).

In one embodiment, the first signaling is transmitted on a Physical Downlink Shared Channel (PDSCH).

In one embodiment, the first signaling is transmitted on a Physical Sidelink Shared Channel (PSSCH).

In one embodiment, the first signaling is transmitted on a Physical Sidelink Control Channel (PSCCH).

In one embodiment, the second signaling is a dynamic signaling.

In one embodiment, the second signaling is a layer 1 (L1) signaling.

In one embodiment, the second signaling is a layer 1 (L1) control signaling.

In one embodiment, the second signaling is transmitted in SideLink.

In one embodiment, the second signaling is transmitted via a PC5 interface.

In one embodiment, the second signaling is transmitted in DownLink.

In one embodiment, the second signaling is transmitted via a Uu interface.

In one embodiment, the second signaling is transmitted by Unicast.

In one embodiment, the second signaling is transmitted by Groupcast.

In one embodiment, the second signaling is transmitted by Broadcast.

In one embodiment, the second signaling is Cell-Specific.

In one embodiment, the second signaling is UE-Specific.

In one embodiment, the second signaling comprises all or part of a Higher Layer signaling.

In one embodiment, the second signaling comprises all or part of a Radio Resource Control (RRC) layer signaling.

In one embodiment, the second signaling comprises one or more fields in an RRC Information Element (IE).

In one embodiment, the second signaling comprises one or more fields in a System Informant Block (SIB).

In one embodiment, the second signaling comprises all or part of a MAC layer signaling.

In one embodiment, the second signaling comprises one or more fields in a MAC Control Element (CE).

In one embodiment, the second signaling comprises one or more fields in a Physical (PHY) layer signaling.

In one embodiment, the second signaling comprises Sidelink Control Information (SCI).

In one embodiment, the second signaling comprises one or more fields in an SCI.

In one embodiment, the second signaling comprises one or more fields in an SCI format.

In one embodiment, the second signaling comprises Downlink Control Information (DCI).

In one embodiment, the second signaling comprises one or more fields in a DCI.

In one embodiment, the second signaling is semi-statically configured.

In one embodiment, the second signaling is dynamically configured.

In one embodiment, the second signaling is transmitted on a Physical Downlink Control Channel (PDCCH).

In one embodiment, the second signaling is transmitted on a Physical Downlink Shared Channel (PDSCH).

In one embodiment, the second signaling is transmitted on a Physical Sidelink Shared Channel (PSSCH).

In one embodiment, the second signaling is transmitted on a Physical Sidelink Control Channel (PSCCH).

In one embodiment, the second signaling is transmitted by a Group Common PDCCH.

In one embodiment, the second signaling is transmitted through a NR DCI format 2_0.

In one embodiment, the second signaling comprises a CSI request.

In one embodiment, the first information block is a dynamic signaling.

In one embodiment, the first information block is a layer 1 (L1) signaling.

In one embodiment, the first information block is a layer 1 (L1) control signaling.

In one embodiment, the first information block is transmitted in SideLink.

In one embodiment, the first information block is transmitted via a PC5 interface.

In one embodiment, the first information block is transmitted in DownLink.

In one embodiment, the first information block is transmitted via a Uu interface.

In one embodiment, the first information block comprises all or part of a Higher Layer signaling.

In one embodiment, the first information block comprises all or part of a MAC layer signaling.

In one embodiment, the first information block comprises one or more fields in a MAC Control Element (CE).

In one embodiment, the first information block comprises one or more fields in a Physical (PHY) layer signaling.

In one embodiment, the first information block comprises Sidelink Control Information (SCI).

In one embodiment, the first information block comprises one or more fields in an SCI.

In one embodiment, the first information block comprises one or more fields in an SCI format.

In one embodiment, the first information block comprises Uplink Control Information (UCI).

In one embodiment, the first information block comprises one or more fields in a UCI.

In one embodiment, time-frequency resources occupied by the first information block are semi-statically configured.

In one embodiment, time-frequency resources occupied by the first information block are dynamically configured.

In one embodiment, the first information block is transmitted on a Physical Uplink Control Channel (PUCCH).

In one embodiment, the first information block is transmitted on a Physical Uplink Shared Channel (PUSCH).

In one embodiment, the first information block is transmitted on a Physical Sidelink Shared Channel (PSSCH).

In one embodiment, the first information block is transmitted on a Physical Sidelink Control Channel (PSCCH).

In one embodiment, the first configuration information comprises CSI resource configuration.

In one embodiment, the first configuration information comprises CSI measurement configuration.

In one embodiment, the first configuration information comprises CSI report configuration.

In one embodiment, the first configuration information is used to determine time-frequency resources occupied by any reference signal among the Q1 reference signals.

In one embodiment, the first configuration information is used to determine a period and an offset for any reference signal among the Q1 reference signals.

In one embodiment, the first configuration information is used to determine a frequency-domain density of any reference signal among the Q1 reference signals.

In one embodiment, the first configuration information is used to determine a number of ports and the port numbers for any reference signal among the Q1 reference signals.

In one embodiment, the first configuration information is used to determine numbers of CSI-RS resources.

In one embodiment, the first configuration information is used to determine numbers of SSBs.

In one embodiment, the Q1 reference signals comprise a downlink reference signal.

In one embodiment, the Q1 reference signals comprise a sidelink reference signal.

In one embodiment, the Q1 reference signals comprise Q1 CSI-RSs.

In one embodiment, the Q1 reference signals comprise Q1 CSI-RS resources.

In one embodiment, the Q1 reference signals comprise Q1 SSBs.

In one embodiment, the Q1 reference signals comprise N1 CSI-RS resources and N2 SSBs, where N1 and N2 are both positive integers, and N1+N2=Q1.

In one embodiment, any of the Q1 reference signals comprise a positive integer number of antenna port(s).

In one embodiment, the spatial parameter comprises a Transmission Configuration Indicator (TCI) state.

In one embodiment, the TCI state is used to determine a QCL parameter.

In one embodiment, the spatial parameter comprises Quasi-Co-Location (QCL) parameter.

In one embodiment, the spatial parameter comprises a transmission beam parameter.

In one embodiment, the spatial parameter comprises a reception beam parameter.

In one embodiment, the spatial parameter comprises a QCL type.

In one embodiment, the QCL type comprised in the spatial parameter is QCL-typeD.

In one embodiment, the spatial parameter comprises a QCL correlation with a reference signal.

In one embodiment, the spatial parameter comprises a QCL correlation with a CSI-RS resource.

In one embodiment, the spatial parameter comprises a QCL correlation with an SSB.

In one embodiment, Q1 spatial parameters respectively associated with the Q1 reference signals are used to determine receiving beams of the Q1 reference signals.

In one embodiment, Q1 spatial parameters respectively associated with the Q1 reference signals are used to determine spatial reception parameters of the Q1 reference signals.

In one embodiment, Q1 spatial parameters respectively associated with the Q1 reference signals are used to determine transmitting beams of the Q1 reference signals.

In one embodiment, Q1 spatial parameters respectively associated with the Q1 reference signals are used to determine spatial transmission parameters of the Q1 reference signals.

In one embodiment, Q1 spatial parameters respectively associated with the Q1 reference signals are used to determine a QCL correlation between any reference signal and the other reference signal among the Q1 reference signals.

In one embodiment, with the Q1 reference signals being Q1 CSI-RS resources, Q1 spatial parameters respectively associated with the Q1 reference signals are used to determine a QCL correlation between any CSI-RS resource and the other CSI-RS resource among the Q1 CSI-RS resources.

In one subembodiment, the other reference signal is an SSB.

In one subembodiment, the other reference signal is a CSI-RS resource.

In one embodiment, the specific definition of the QCL can be found in 3GPP TS38.214, Section 5.1.5.

In one embodiment, the QCL correlation between a reference signal and another reference signal means that all or partial large-scale properties of a radio signal transmitted on an antenna port corresponding to the reference signal can be inferred from all or partial large-scale properties of a radio signal transmitted on an antenna port corresponding to the other reference signal.

In one embodiment, large-scale properties of a radio signal include one or more of a delay spread, a Doppler spread, a Doppler shift, a path loss, an average gain, an average delay or Spatial Rx parameters.

In one embodiment, the Spatial Rx parameters comprise one or more of a receiving beam, a reception analog beamforming matrix, a reception analog beamforming vector, a reception beamforming vector, a reception spatial filter or a spatial domain reception filter.

In one embodiment, the QCL correlation between a reference signal and another reference signal means that the reference signal and the other reference signal at least have one QCL parameter in common.

In one embodiment, QCL parameters include one or more of a delay spread, a Doppler spread, a Doppler shift, a path loss, an average gain, an average delay or Spatial Rx parameters.

In one embodiment, the QCL correlation between a reference signal and another reference signal means that at least one QCL parameter of the reference signal can be inferred from at least one QCL parameter of the other reference signal.

In one embodiment, the QCL type between a reference signal and another reference signal being QCL-TypeD means that Spatial Rx parameters of a radio signal transmitted on an antenna port corresponding to the reference signal can be inferred from Spatial Rx parameters of a radio signal transmitted on an antenna port corresponding to the other reference signal.

In one embodiment, the QCL type between a reference signal and another reference signal being QCL-TypeD means that the same Spatial Rx parameters can be used to receive the reference signal and the other reference signal.

In one embodiment, a result of measurements on reference signals in the first reference signals subset is used to determine a first measurement value, the first measurement value being used to determine the first information block.

In one subembodiment, the first measurement value includes one or more of a Rank Indicator (RI), a Channel-state information reference signals Resource Indicator (CRI), a Reference Signal Received Power (RSRP), a Received Signal Strength Indication (RSSI), an SSB index, a Reference Signal Recei Quality (RSRQ), a Precoding Matrix Indicator (PMI) or a Channel Quality Indicator (CQI).

In one subembodiment, the first reporting information comprises a quantized value of the first measurement value.

In one embodiment, at least one first-type reference signal in the first reference signal subset is used for channel measurement.

In one embodiment, at least one first-type reference signal in the first reference signal subset is used for interference measurement.

In one embodiment, at least one first-type reference signal in the first reference signal subset is used for beam measurement.

Embodiment 2

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/ Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/ Unified Data Management (HSS/UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC210 via an S1/NG interface. The 5GC/EPC 210 comprises a Mobility Management Entity (MME)/Authentication Management Field (AMF)/ Session Management Function (SMF) 211, other MMEs/ AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/ UPF 212. The S-GW/UPF 212 is connected to the P-GW/ UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application includes the gNB203.

In one embodiment, the second node in the present application includes the gNB203.

In one embodiment, the second node in the present application includes the UE 241.

In one embodiment, the first node in the present application includes the UE 241.

In one embodiment, the second node in the present application includes the UE 201.

In one embodiment, the second node in the present application includes the gNB204.

In one embodiment, the UE in the present application includes the UE 201.

In one embodiment, the UE in the present application includes the UE 241.

In one embodiment, the base station in the present application includes the gNB203.

In one embodiment, the base station in the present application includes the gNB204.

In one embodiment, the UE 201 supports sidelink transmission.

In one embodiment, the UE 201 supports a PC5 interface.

In one embodiment, the UE 201 supports a Uu interface.

In one embodiment, the UE 241 supports sidelink transmission.

In one embodiment, the UE 241 supports a PC5 interface.

In one embodiment, the gNB203 supports a Uu interface.

Embodiment 3

Figure 3:
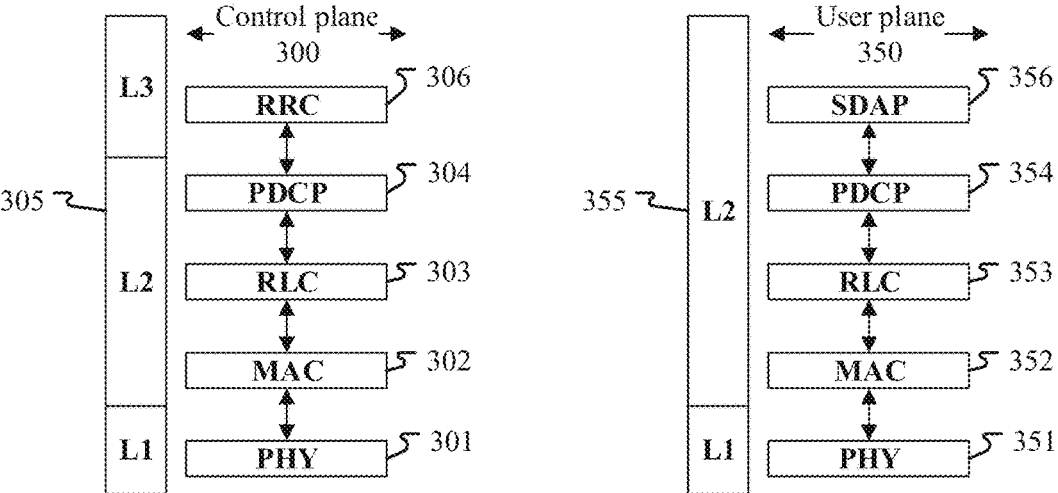
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or, RSU in V2X, vehicle-mounted equipment or vehicle-mounted communication modules) and a second communication node (gNB, UE, or RSU in V2X, vehicle-mounted equipment or vehicle-mounted communication modules), or between two UEs, is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides packet encryption and integrity protection and also support for inter-cell handover of the second node between first nodes. The RLC sublayer 303 provides packet segmentation and reordering, retransmission of a lost packet through ARQ and detection of duplicate packets and protocol error check. The MAC sublayer 302 provides mapping between a logical channel and a transport channel as well as multiplexing of logical channels. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the PHY 351.

In one embodiment, the first signaling in the present application is generated by the MAC 352.

In one embodiment, the first signaling in the present application is generated by the PHY 301.

In one embodiment, the first signaling in the present application is generated by the MAC 302.

In one embodiment, the first signaling in the present application is generated by the RRC 306.

In one embodiment, the second signaling in the present application is generated by the PHY 351.

In one embodiment, the second signaling in the present application is generated by the MAC 352.

In one embodiment, the second signaling in the present application is generated by the PHY 301.

In one embodiment, the second signaling in the present application is generated by the MAC 302.

In one embodiment, the second signaling in the present application is generated by the RRC306.

In one embodiment, the first radio signal in the present application is generated by the PHY351.

In one embodiment, the first radio signal in the present application is generated by the MAC352.

In one embodiment, the first radio signal in the present application is generated by the PHY301.

In one embodiment, the first radio signal in the present application is generated by the MAC302.

In one embodiment, the first radio signal in the present application is generated by the RRC306.

In one embodiment, the first information block in the present application is generated by the PHY 351.

In one embodiment, the first information block in the present application is generated by the MAC 352.

In one embodiment, the first information block in the present application is generated by the PHY 301.

In one embodiment, the first information block in the present application is generated by the MAC 302.

Embodiment 4

Figure 4:
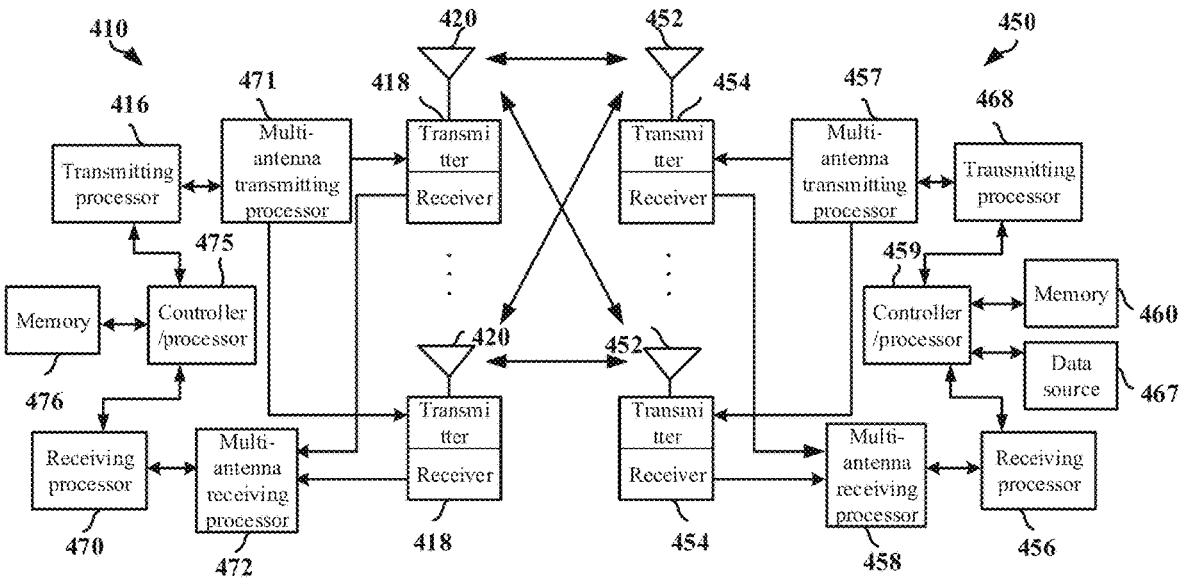
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beam-forming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is config-ured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet seg-mentation and reordering, and multiplexing between a logi-cal channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The trans-mitting processor 468 performs modulation and mapping, as well as channel coding, and the multi-antenna transmitting processor 457 performs digital multi-antenna spatial precod-ing, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiv-ing function of the second communication device 450 described in the transmission from the first communication device 410 to the second communication device 450. Each receiver 418 receives a radio frequency signal via a corre-sponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission between the second communication device 450 and the first communi-cation device 410, the controller/processor 475 provides de-multiplexing between a transport channel and a logical channel, packet reassembling, decrypting, header decom-pression, control signal processing so as to recover a higher-layer packet from the second communication device (UE) 450. The higher-layer packet coming from the controller/processor 475 may be provided to the core network.

In one embodiment, the first node in the present applica-tion comprises the second communication device 450, and the second node in the present application comprises the first communication device 410.

In one embodiment, the first node in the present applica-tion comprises the first communication device 410, and the second node in the present application comprises the second communication device 450.

In one embodiment, the first node in the present applica-tion comprises the second communication device 450, and the second node in the present application comprises the second communication device 450.

In one subembodiment, the second communication device 450 comprises: at least one controller/processor; the at least one controller/processor is responsible for HARQ operation.

In one subembodiment, the first communication device 410 comprises: at least one controller/processor; the at least one controller/processor is responsible for HARQ operation.

In one subembodiment, the first communication device 410 comprises: at least one controller/processor; the at least one controller/processor is responsible for using ACK and/or NACK protocols for error checking as a way of supporting HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signaling and a second signaling; and performs a first channel sensing operation on a first sub-band; transmits a first radio signal in a first time-frequency resource group in the first sub-band, or, drops transmitting a first radio signal in a first time-frequency resource group in the first sub-band; herein, the first signaling is used to determine a first reference signal resource group, the first signaling being non-unicast; the second signaling indicates a second reference signal resource group; when the first time-frequency resource group belongs to a first time window in time domain, the first reference signal resource group and the second reference signal resource group are used together to determine a type of the first channel sensing operation from a first candidate type set, and when the first time-frequency resource group does not belong to the first time window in time domain, the type of the first channel sensing operation is unrelated to the second reference signal resource group; the first candidate type set comprises a first type and a second type.

In one embodiment, the second communication device 450 comprises a memory that stores computer readable instruction program, the computer readable instruction program generates an action when executed by at least one processor, which includes: receiving a first signaling and a second signaling; and performing a first channel sensing operation on a first sub-band; transmitting a first radio signal in a first time-frequency resource group in the first sub-band, or, dropping transmitting a first radio signal in a first time-frequency resource group in the first sub-band; herein, the first signaling is used to determine a first reference signal resource group, the first signaling being non-unicast; the second signaling indicates a second reference signal resource group; when the first time-frequency resource group belongs to a first time window in time domain, the first reference signal resource group and the second reference signal resource group are used together to determine a type of the first channel sensing operation from a first candidate type set, and when the first time-frequency resource group does not belong to the first time window in time domain, the type of the first channel sensing operation is unrelated to the second reference signal resource group; the first candidate type set comprises a first type and a second type.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits a first signaling and a second signaling; and performs a second channel sensing operation on a first sub-band; performs a first detecting operation on a first time-frequency resource group on the first sub-band, the first detecting operation being used to determine whether a first radio signal is received on the first time-frequency resource group; herein, the first signaling is used to determine a first reference signal resource group, the first signaling being non-unicast; the second signaling indicates a second reference signal resource group; the second channel sensing operation is used to determine a first time window; a first channel sensing operation is used to determine whether the first radio signal is transmitted, where a performer of the first channel sensing operation is a receiver for the second signaling; when the first time-frequency resource group belongs to a first time window in time domain, the first reference signal resource group and the second reference signal resource group are used together to determine a type of the first channel sensing operation from a first candidate type set, when the first time-frequency resource group does not belong to the first time window in time domain, the type of the first channel sensing operation is unrelated to the second reference signal resource group; the first candidate type set comprises a first type and a second type.

In one embodiment, the first communication device 410 comprises a memory that stores computer readable instruction program, the computer readable instruction program generates an action when executed by at least one processor, which includes: transmitting a first signaling and a second signaling; and performing a second channel sensing operation on a first sub-band; performing a first detecting operation on a first time-frequency resource group on the first sub-band, the first detecting operation being used to determine whether a first radio signal is received on the first time-frequency resource group; herein, the first signaling is used to determine a first reference signal resource group, the first signaling being non-unicast; the second signaling indicates a second reference signal resource group; the second channel sensing operation is used to determine a first time window; a first channel sensing operation is used to determine whether the first radio signal is transmitted, where a performer of the first channel sensing operation is a receiver for the second signaling; when the first time-frequency resource group belongs to a first time window in time domain, the first reference signal resource group and the second reference signal resource group are used together to determine a type of the first channel sensing operation from a first candidate type set, when the first time-frequency resource group does not belong to the first time window in time domain, the type of the first channel sensing operation is unrelated to the second reference signal resource group; the first candidate type set comprises a first type and a second type.

In one embodiment, at least one of the antenna 452, the receiver 454, the multi-antenna receiving processor 458, the receiving processor 456, the controller/processor 459, the memory 460, or the data source 467 is used for receiving the first signaling in the present application.

In one embodiment, at least one of the antenna 452, the receiver 454, the multi-antenna receiving processor 458, the receiving processor 456, the controller/processor 459, the memory 460, or the data source 467 is used for receiving the second signaling in the present application.

In one embodiment, at least one of the antenna 452, the receiver 454, the multi-antenna receiving processor 458, the receiving processor 456, the controller/processor 459, the memory 460, or the data source 467 is used for receiving the first radio signal in the present application.

In one embodiment, at least one of the antenna 420, the receiver 418, the multi-antenna receiving processor 472, the receiving processor 470, the controller/processor 475, or the memory 476 is used for transmitting the first signaling in the present application.

In one embodiment, at least one of the antenna 420, the receiver 418, the multi-antenna receiving processor 472, the receiving processor 470, the controller/processor 475, or the memory 476 is used for transmitting the second signaling in the present application.

In one embodiment, at least one of the antenna 420, the receiver 418, the multi-antenna receiving processor 472, the receiving processor 470, the controller/processor 475, or the memory 476 is used for transmitting the first radio signal in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signaling; receives a second signaling; and transmits a first information block; herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, the second communication device 450 comprises a memory that stores computer readable instruction program, the computer readable instruction program generates an action when executed by at least one processor, which includes: receiving a first signaling; receiving a second signaling; and transmitting a first information block; herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits a first signaling; transmits a second signaling; and receives a first information block; herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, the first communication device 410 comprises a memory that stores computer readable instruction program, the computer readable instruction program generates an action when executed by at least one processor, which includes: transmitting a first signaling; transmitting a second signaling; and receiving a first information block; herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, at least one of the antenna 452, the receiver 454, the multi-antenna receiving processor 458, the receiving processor 456, the controller/processor 459, the memory 460, or the data source 467 is used for receiving the first signaling in the present application.

In one embodiment, at least one of the antenna 452, the receiver 454, the multi-antenna receiving processor 458, the receiving processor 456, the controller/processor 459, the memory 460, or the data source 467 is used for receiving the second signaling in the present application.

In one embodiment, at least one of the antenna 420, the receiver 418, the multi-antenna receiving processor 472, the receiving processor 470, the controller/processor 475, or the memory 476 is used for transmitting the first signaling in the present application.

In one embodiment, at least one of the antenna 420, the receiver 418, the multi-antenna receiving processor 472, the receiving processor 470, the controller/processor 475, or the memory 476 is used for transmitting the second signaling in the present application.

In one embodiment, at least one of the antenna 420, the receiver 418, the multi-antenna receiving processor 472, the receiving processor 470, the controller/processor 475, or the memory 476 is used for transmitting the first information block in the present application.

In one embodiment, at least one of the antenna 452, the receiver 454, the multi-antenna receiving processor 458, the receiving processor 456, the controller/processor 459, the memory 460, or the data source 467 is used for receiving the first information block in the present application.

Embodiment 5A

Figure 5A:
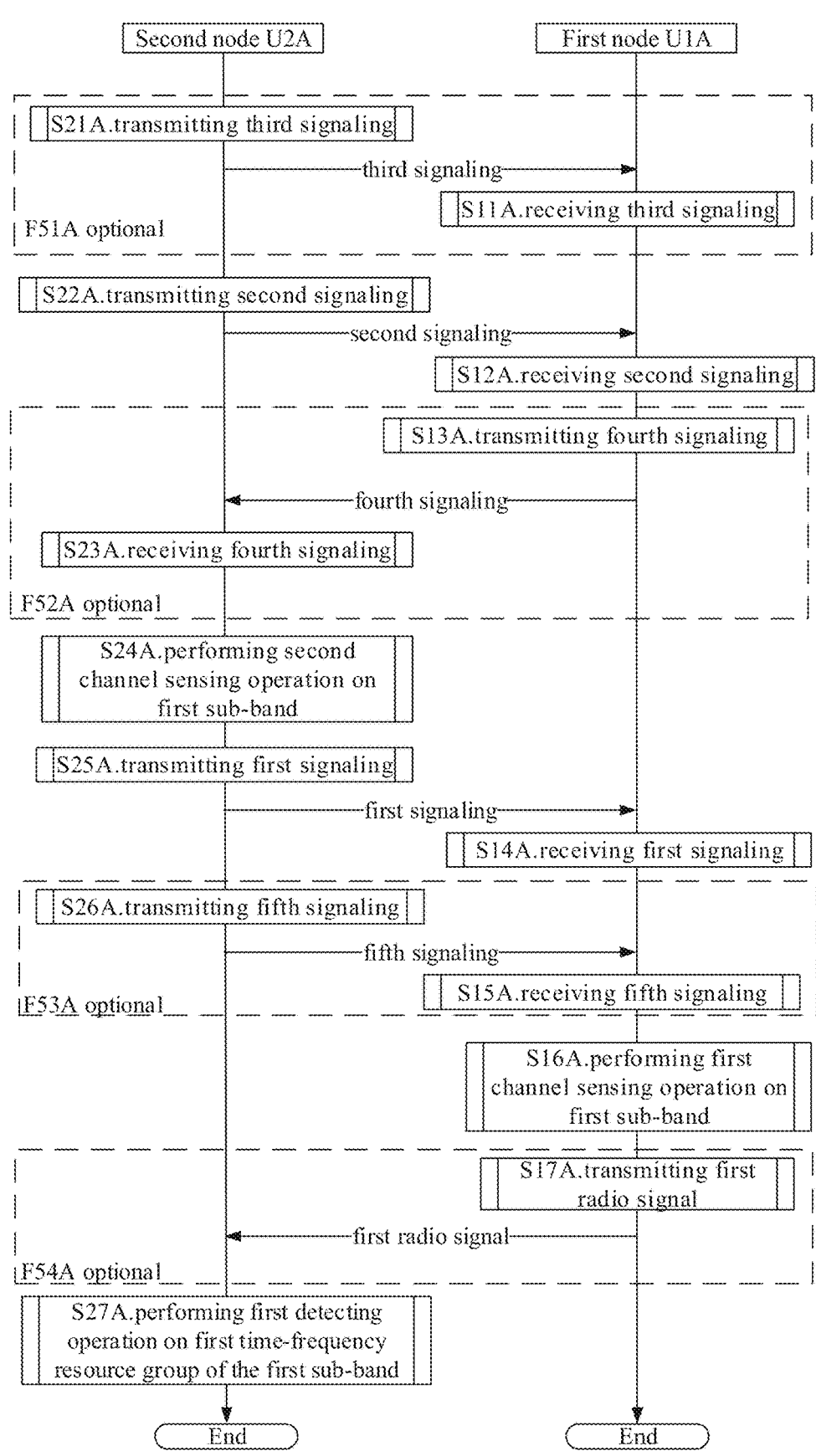
FIG. 5A illustrates a flowchart of radio signal transmission according to one embodiment of the present application.

Embodiment 5A illustrates a flowchart of radio signal transmission according to one embodiment of the present application, as shown in FIG. 5A. In FIG. 5A, a first node U1A and a second node U2A are in communications via an air interface. In FIG. 5A, the sequential step arrangement in each box herein does not imply a chronological order of steps marked respectively by these boxes.

The first node U1A receives a third signaling in step S11A, receives a second signaling in step S12A, and transmits a fourth signaling in step S13A, receives a first signaling in step S14A, and receives a fifth signaling in step S15A, performs a first channel sensing operation on a first sub-band in step S16A, and transmits a first radio signal in step S17A. The second node U2A transmits a third signaling in step S21A, transmits a second signaling in step S22A, and receives a fourth signaling in step S23A, performs a second channel sensing operation on a first sub-band in step S24A, and transmits a first signaling in step S25A, transmits a fifth signaling in step S26A, and performs a first detecting operation on a first time-frequency resource group in the first sub-band in step S27A. Herein, steps S11A and S21A in the box 51A are optional; steps S13A and S23A in the box 52A are optional; steps S15A and S26A in the box 53A are optional; steps S17A in the box 54A is optional.

In Embodiment 5A, the first signaling is used to determine a first reference signal resource group, the first signaling being non-unicast; the second signaling indicates a second reference signal resource group; the second channel sensing operation is used to determine a first time window; a first channel sensing operation is used to determine whether the first radio signal is transmitted, where a performer of the first channel sensing operation is a receiver for the second signaling; when the first time-frequency resource group belongs to a first time window in time domain, the first reference signal resource group and the second reference signal resource group are used together to determine a type of the first channel sensing operation from a first candidate type set, when the first time-frequency resource group does not belong to the first time window in time domain, the type of the first channel sensing operation is unrelated to the second reference signal resource group; the first candidate type set comprises a first type and a second type. The third signaling indicates a third reference signal resource group; and the fourth signaling is used to determine whether the second signaling is correctly received; the fifth signaling comprises an indication of transmitting the first radio signal.

In one embodiment, an air interface between the second node U2A and the first node U1A includes a PC5 interface.

In one embodiment, an air interface between the second node U2A and the first node U1A includes a sidelink.

In one embodiment, an air interface between the second node U2A and the first node U1A includes a Uu interface.

In one embodiment, an air interface between the second node U2A and the first node U1A includes a cellular link.

In one embodiment, an air interface between the second node U2A and the first node U1A includes a radio interface between a UE and another UE.

In one embodiment, an air interface between the second node U2A and the first node U1A includes a radio interface between a base station and a UE.

Embodiment 5B

Figures 5B, 6A:
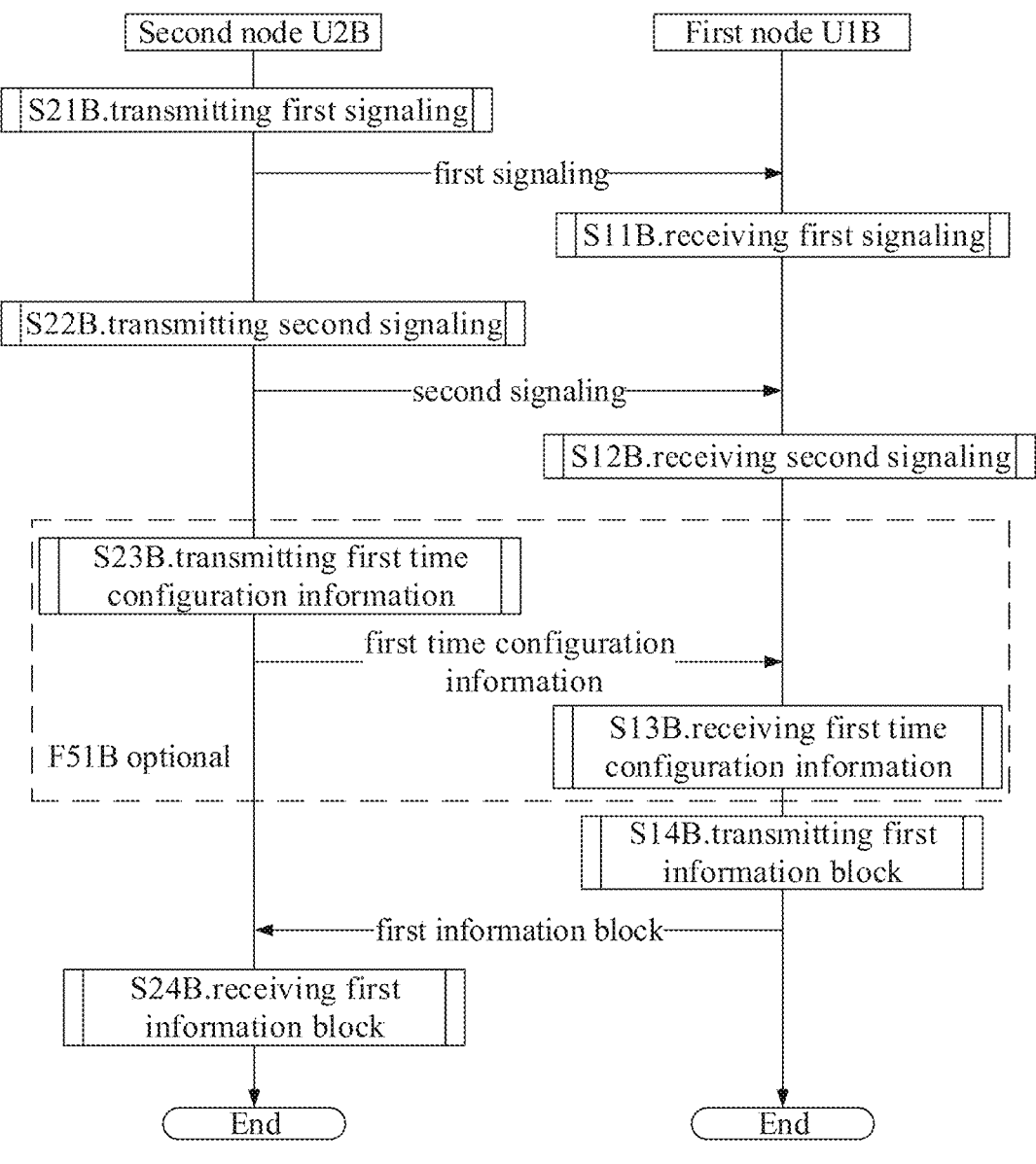
FIG. 5B illustrates a flowchart of radio signal transmission according to one embodiment of the present application.
FIG. 6A illustrates a schematic diagram of time-domain resources respectively occupied by a first time window, a first signaling and a second channel sensing operation according to one embodiment of the present application.

Embodiment 5B illustrates a flowchart of radio signal transmission according to one embodiment of the present application, as shown in FIG. 5B. In FIG. 5B, a first node U1B and a second node U2B are in communications via an air interface. In FIG. 5B, the sequential step arrangement in each box herein does not imply a chronological order of steps marked respectively by these boxes.

The first node U1B receives a first signal in step S11B; receives a second signaling in step S12B; and receives first time configuration information in step S13B; and transmits a first information block in step S14B. The second node U2B transmits a first signaling in step S21B; transmits a second signaling in step S22B; and transmits first time configuration information in step S23B; and receives a first information block in step S24B. Herein, steps S23B and S13B contained in the dotted-line box F51B are optional.

In Embodiment 5B, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block. The first time configuration information being used to determine a first time window, the first spatial configuration information being valid within the first time window.

In one embodiment, an air interface between the second node U2B and the first node U1B includes a PC5 interface.

In one embodiment, an air interface between the second node U2B and the first node U1B includes a sidelink.

In one embodiment, an air interface between the second node U2B and the first node U1B includes a Uu interface.

In one embodiment, an air interface between the second node U2B and the first node U1B includes a cellular link.

In one embodiment, an air interface between the second node U2B and the first node U1B includes a radio interface between a UE and another UE.

In one embodiment, an air interface between the second node U2B and the first node U1B includes a radio interface between a base station and a UE.

In one embodiment, the first node in the present application is a terminal.

In one embodiment, the first node in the present application is an automobile.

In one embodiment, the first node in the present application is a vehicle.

In one embodiment, the first node in the present application is a Road Side Unit (RSU).

In one embodiment, the first node in the present application is a base station.

In one embodiment, the second node in the present application is a terminal.

In one embodiment, the second node in the present application is an automobile.

In one embodiment, the second node in the present application is a vehicle.

In one embodiment, the second node in the present application is an RSU.

In one embodiment, the second node in the present application is a base station.

Embodiment 6A

Embodiment 6A illustrates a schematic diagram of time-domain resources respectively occupied by a first time window, a first signaling and a second channel sensing operation according to one embodiment of the present application, as shown in FIG. 6A. In FIG. 6A, time-domain resources of the first signaling are within the first time window. A start of the first time window is after an end of the second channel sensing operation.

In one embodiment, the first time window is a COT.

In one embodiment, the first time window is a COT acquired by the base station.

In one embodiment, the first time window comprises a total duration of a COT.

In one embodiment, the first time window comprises a partial duration of a COT.

In one embodiment, time resources occupied by the first signaling belong to the first time window.

In one embodiment, time resources occupied by the first signaling are located before the first time window.

In one embodiment, the first time window comprises a continuous period of time after time-domain resources occupied by the first signaling.

In one embodiment, time resources occupied by the first signaling belong to a COT, and the first time window comprises remaining time of a COT after time-domain resources occupied by the first signaling.

In one embodiment, the first signaling indicates a time length of the first time window.

In one embodiment, the first signaling indicates an end of the first time window.

In one embodiment, the first signaling indicates frequency-domain resources within the COT.

In one embodiment, performing a second channel sensing operation on the first sub-band includes performing energy detection on the first sub-band.

In one embodiment, the second channel sensing operation is used to determine whether the second node transmits a radio signal in the first sub-band.

In one embodiment, the second channel sensing operation is used to determine whether the first sub-band is idle.

In one embodiment, the second channel sensing operation is used to determine a length of the first time window.

In one embodiment, the second channel sensing operation is used to determine a start of the first time window.

In one embodiment, the first channel sensing operation is used to determine whether the first sub-band is idle, if the first sub-band is idle, the second node transmits a radio signal in the first sub-band; if the first sub-band is non-idle, the second node drops transmitting any radio signal in the first sub-band.

In one embodiment, a type of the second channel sensing operation is Cat 4 LBT.

Embodiment 6B

Figure 6B:
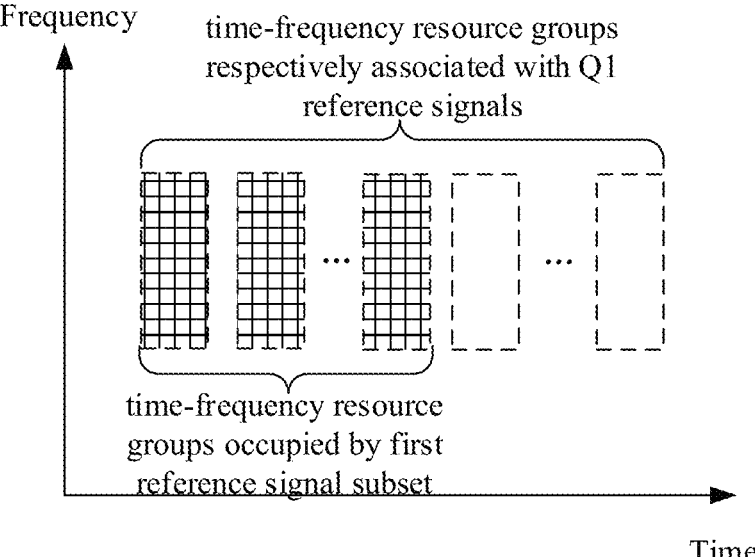
FIG. 6B illustrates a schematic diagram of time-frequency resource groups respectively associated with Q1 reference signals and a time-frequency resource group occupied by a first reference signal subset according to one embodiment of the present application.

Embodiment 6B illustrates a schematic diagram of time-frequency resource groups respectively associated with Q1 reference signals and a time-frequency resource group occupied by a first reference signal subset according to one embodiment of the present application, as shown in FIG. 6B. In FIG. 6B, each dotted-line box represents a time-frequency resource group associated with a reference signal, and the dotted-line box filled with grids represents a time-frequency resource group occupied by reference signal(s) comprised in a first reference signal subset. The size and position of each dotted-line box given in FIG. 6B are only shown for example; time or frequency resources occupied by any reference signal are not limited by the size or the position of the dotted-lined box.

In one embodiment, a time-frequency resource group associated with any reference signal among the Q1 reference signals is determined by the first configuration information.

In one embodiment, a time-frequency resource group associated with any reference signal among the Q1 reference signals comprises a positive integer number of Resource Element(s) (RE(s)) in frequency domain.

In one embodiment, a time-frequency resource group associated with any reference signal among the Q1 reference signals comprises a positive integer number of Resource Block(s) (RB(s)) in frequency domain.

In one embodiment, a time-frequency resource group associated with any reference signal among the Q1 reference signals comprises a positive integer number of multicarrier symbol(s) in time domain.

In one embodiment, a time-frequency resource group associated with any reference signal among the Q1 reference signals is used for transmitting any of the Q1 reference signals.

In one embodiment, a time-frequency resource group associated with any reference signal among the Q1 reference signals occurs periodically in time domain.

In one embodiment, when any reference signal among the Q1 reference signals is transmitted, the any reference signal among the Q1 reference signals occupies a time-frequency resource group associated with the any one of the Q1 reference signals.

In one embodiment, any of the Q1 reference signals is semi-persistently activated.

In one embodiment, any of the Q1 reference signals is semi-persistently deactivated.

In one embodiment, any of the Q1 reference signals is dynamically triggered by a physical layer signaling.

In one embodiment, the first signaling is a physical layer signaling, and the first signaling comprises a CSI request, a behavior of measuring any of the Q1 reference signals being triggered by the CSI request.

In one embodiment, the first signaling is a MAC layer signaling, and the first signaling comprises CSI-RS activation information, a behavior of measuring any of the Q1 reference signals being triggered by the CSI-RS activation information.

In one embodiment, the first signaling is an RRC layer signaling, and the first signaling comprises CSI-RS configuration information, a behavior of measuring any of the Q1 reference signals being indicated by the CSI-RS configuration information.

In one embodiment, the Q1 reference signals are respectively associated with Q1 time-frequency resource groups.

In one embodiment, the first reference signal subset comprises N3 reference signal(s), N3 being a positive integer less than Q1.

In one embodiment, N3 reference signals comprised in the first reference signal subset respectively occupy N3 time-frequency resource groups that are contiguous in time domain among the Q1 time-frequency resource groups.

In one embodiment, N3 reference signals comprised in the first reference signal subset respectively occupy N3 time-frequency resource groups that are non-contiguous in time domain among the Q1 time-frequency resource groups.

In one embodiment, the Q1 time-frequency resource groups are numbered in a temporal order, N3 reference signals comprised in the first reference signal subset respectively occupying the first N3 time-frequency resource groups among the Q1 time-frequency resource groups.

In one embodiment, the Q1 time-frequency resource groups are numbered in a temporal order, N3 reference signals comprised in the first reference signal subset respectively occupying the last N3 time-frequency resource groups among the Q1 time-frequency resource groups.

In one embodiment, when a reference signal is multiplexed with other physical channels, since the reference signal and other physical channels shall be transmitted using a same beam, the method transmits N3 reference signals comprised in the first reference signal subset in time domain at intensive time intervals, thus lifting the limits on the transmitting beam in the above multiplexing scenario.

In one embodiment, the first node assumes that any reference signal of the Q1 reference signals that does not belong to the first reference signal subset is not transmitted within the first time window.

In one embodiment, the phrase that "the first node assumes that any reference signal of the Q1 reference signals that does not belong to the first reference signal subset is not transmitted within the first time window" comprises: when there are overlapping time-frequency resources between time-frequency resources occupied by other radio signals and a time-frequency resource group associated with any reference signal of the Q1 reference signals that does not belong to the first reference signal subset, the first node assumes that the overlapping time-frequency resources are used for transmitting the other radio signals.

In one subembodiment, the other radio signals comprise a PDSCH.

In one subembodiment, the other radio signals comprise a PUCCH.

In one subembodiment, the other radio signals comprise a PUSCH.

In one subembodiment, the other radio signals comprise a DMRS.

Embodiment 7A

Figure 7A:
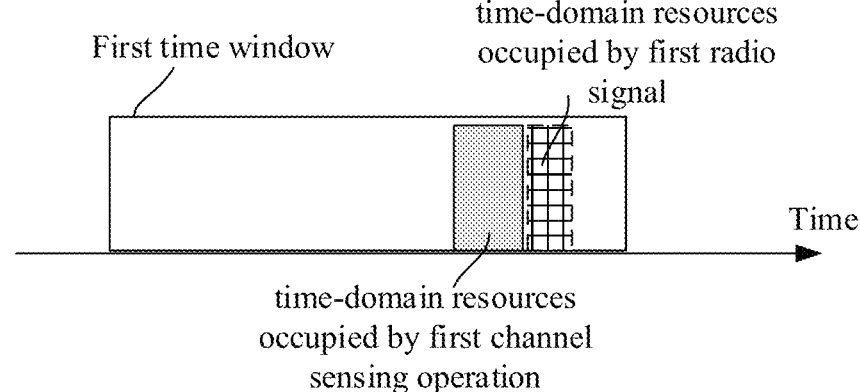
FIG. 7A illustrates a schematic diagram of time-domain resources occupied by a first radio signal and time-domain resources occupied by a first channel sensing operation according to one embodiment of the present application.

Embodiment 7A illustrates a schematic diagram of time-domain resources occupied by a first radio signal and time-domain resources occupied by a first channel sensing operation according to one embodiment of the present application, as shown in FIG. 7A. In FIG. 7A, time-domain resources occupied by a first radio signal are within the first time window, and a first channel sensing operation is performed before the time-domain resources occupied by the first radio signal. Herein, whether the first radio signal is transmitted is optional. When a result of the first channel sensing operation turns out that the first sub-band is idle, the first radio signal is transmitted; when a result of the first channel sensing operation turns out that the first sub-band is non-idle, the first radio signal is not transmitted. In FIG. 7A, when the first reference signal resource group and the second reference signal resource group are spatially correlated, the type of the first channel sensing operation is determined to be a second type; and, if before receiving the first signaling, the type of the first channel sensing operation is determined to be a first type; the type of the first channel sensing operation is switched from the first type to the second type. In FIG. 7A, the first reference signal resource group and the second reference signal resource group are jointly used to determine a type of the first channel sensing operation from a first candidate type set.

In one embodiment, the second signaling indicates multiple time-frequency resource groups, with the first time-frequency resource group being one of the multiple time-frequency resource groups.

In one embodiment, the second signaling indicates multiple time-frequency resource groups respectively occupied by multiple first-type signals, with the first radio signal being one of the multiple first-type signals, and the first time-frequency resource group being one of the multiple time-frequency resource groups.

In one embodiment, the first-type signal comprises a Grant-free scheduled PUSCH.

In one embodiment, the first-type signal comprises a semi-persistently scheduled PUSCH.

In one embodiment, the first-type signal comprises a PUSCH with configured grant.

In one embodiment, the first-type signal comprises a periodic PUCCH.

In one embodiment, the first-type signal comprises a periodic SRS.

In one embodiment, the first-type signal comprises a semi-persistent SRS.

In one embodiment, the first-type signal comprises a semi-persistent PUCCH.

In one subembodiment, a default channel sensing type of the first-type signal is the first type.

In one subembodiment, the default channel sensing type is a channel sensing type pre-defined for the first-type signal.

In one subembodiment, the default channel sensing type is a channel sensing type of a first-type signal indicated by the second signaling.

In one embodiment, the phrase that "before receiving the first signaling, the type of the first channel sensing operation is determined to be a first type" comprises that before receiving the first signaling, a default channel sensing type of the first-type signal is determined to be a first type.

In one embodiment, the fifth signaling in the present application comprises an indication of transmitting the first radio signal; when the first time-frequency resource group belongs to the first time window in time domain, and the first reference signal resource group and the second reference signal resource group are not spatially correlated, the indication of transmitting the first radio signal is used to determine whether the first radio signal is allowed to be transmitted.

In one embodiment, the fifth signaling is a physical layer signaling.

In one embodiment, the fifth signaling is a higher layer signaling.

In one embodiment, the fifth signaling is an RRC layer signaling.

In one embodiment, the fifth signaling comprises one or more fields in a DCI.

In one embodiment, the fifth signaling is non-unicast.

In one embodiment, the fifth signaling is unicast.

In one embodiment, the fifth signaling is transmitted through a group-common physical layer control channel.

In one embodiment, the fifth signaling is transmitted through a DCI format 2_0.

In one embodiment, the fifth signaling and the first signaling are transmitted through a same DCI.

In one embodiment, when the first time-frequency resource group belongs to a first time window in time domain, a channel access priority of the first radio signal is used to determine the type of the first channel sensing operation.

In one subembodiment, when the first time-frequency resource group belongs to the first time window in time domain, and the first reference signal resource group and the second reference signal resource group are not spatially correlated, the channel access priority of the first radio signal is used to determine whether the first radio signal is allowed to be transmitted.

In one subembodiment, the phrase that "the channel access priority of the first radio signal is used to determine whether the first radio signal is allowed to be transmitted" comprises that when the channel access priority of the first radio signal belongs to a first priority subset, the first radio signal is allowed to be transmitted; when the channel access priority of the first radio signal belongs to a second priority subset, the first radio signal is not allowed to be transmitted.

In one subembodiment, the phrase that "the channel access priority of the first radio signal is used to determine whether the first radio signal is allowed to be transmitted" comprises that when the channel access priority of the first radio signal is greater than a first designated priority, the first radio signal is allowed to be transmitted; when the channel access priority of the first radio signal is no greater than the first designated priority, the first radio signal is not allowed to be transmitted.

In one subembodiment, the phrase that "the channel access priority of the first radio signal is used to determine whether the first radio signal is allowed to be transmitted" comprises that when the channel access priority of the first radio signal is smaller than a first designated priority, the first radio signal is allowed to be transmitted; when the channel access priority of the first radio signal is no smaller than the first designated priority, the first radio signal is not allowed to be transmitted.

In one subembodiment, a channel access priority set comprises K1 channel access priorities, K1 being an integer greater than 1, the first priority subset comprising K2 channel access priority/priorities among the K1 channel access priorities; the second priority subset comprises K3 channel access priority/priorities among the K1 channel access priorities not belonging to the first priority subset; where K2 and K3 are positive integers less than K1.

In one subembodiment, a channel access priority set comprises K1 channel access priorities, K1 being an integer greater than 1, the first designated priority being one of the K1 channel access priorities.

In one embodiment, if the first radio signal is allowed to be transmitted, the type of the first channel sensing operation is a first type.

In one embodiment, if the first radio signal is allowed to be transmitted, the type of the first channel sensing operation is Cat 4 LBT.

In one embodiment, if the first radio signal is not allowed to be transmitted, the first channel sensing operation is not performed.

Embodiment 7B

Figure 7B:
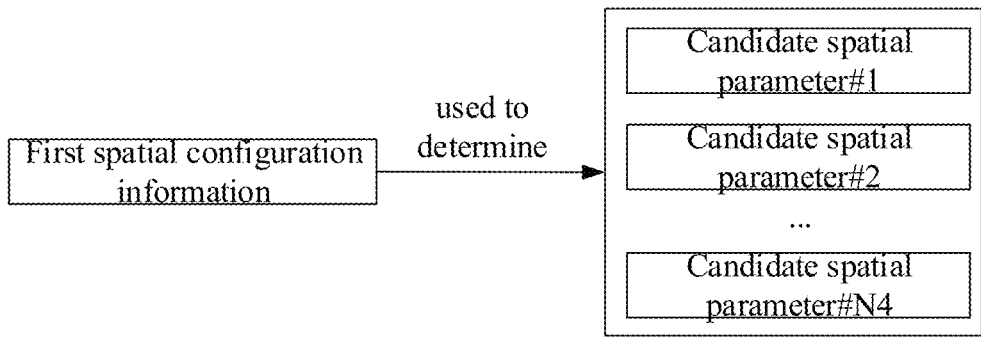
FIG. 7B illustrates a schematic diagram of first spatial configuration information according to one embodiment of the present application.

Embodiment 7B illustrates a schematic diagram of first spatial configuration information according to one embodiment of the present application, as shown in FIG. 7B. In FIG. 7B, first spatial configuration information is used to determine N4 candidate spatial parameters, the suffix # and figures are combined to distinguish the N4 candidate spatial parameters, where N4 is an integer greater than 1.

In one embodiment, a spatial parameter associated with any said reference signal in the first reference signal subset is one of the N4 candidate spatial parameters.

In one embodiment, the candidate spatial parameter comprises a TCI state.

In one embodiment, the candidate spatial parameter comprises a QCL parameter.

In one embodiment, the candidate spatial parameter comprises a transmission beam parameter.

In one embodiment, the candidate spatial parameter comprises a reception beam parameter.

In one embodiment, the candidate spatial parameter comprises a QCL type.

In one embodiment, the QCL type comprised in the candidate spatial parameter is QCL-typeD.

In one embodiment, the candidate spatial parameter comprises a QCL correlation with a reference signal.

In one embodiment, the candidate spatial parameter comprises a QCL correlation with a CSI-RS resource.

In one embodiment, the candidate spatial parameter comprises a QCL correlation with an SSB.

In one embodiment, if a spatial parameter associated with a reference signal is a candidate spatial parameter #i, the candidate spatial parameter #i is used to determine a QCL correlation between the reference signal and another reference signal, where i is an integer no greater than N4, the other reference signal being a CSI-RS resource or an SSB, the candidate spatial parameter #i being used to determine the other reference signal.

In one embodiment, the first spatial configuration information comprises a TCI state.

In one embodiment, the first spatial configuration information comprises a CSI-RS resource index.

In one subembodiment, a CSI-RS resource indicated by the CSI-RS resource index comprised in the first spatial configuration information is QCL correlated with multiple reference signals.

In one subembodiment, a CSI-RS resource indicated by the CSI-RS resource index comprised in the first spatial configuration information is transmitted using a wide beam.

In one subembodiment, a CSI-RS resource indicated by the CSI-RS resource index comprised in the first spatial configuration information is transmitted using multiple beams.

In one embodiment, the first spatial configuration information comprises an SSB index.

In one subembodiment, an SSB indicated by the SSB index comprised in the first spatial configuration information is QCL correlated with multiple reference signals.

In one subembodiment, an SSB indicated by the SSB index comprised in the first spatial configuration information is transmitted using a wide beam.

In one subembodiment, an SSB indicated by the SSB index comprised in the first spatial configuration information is transmitted using multiple beams.

In one embodiment, the first spatial configuration information comprises a target index, and a first index set comprises multiple first indexes, the target index being one of the multiple first indexes, any of the multiple first indexes being used to determine multiple said candidate spatial parameters.

In one subembodiment, the first index comprises a TCI state group indication, and the candidate spatial parameter includes a TCI state, the TCI state group indication being used to determine multiple TCI states.

Embodiment 8A

Figure 8A:
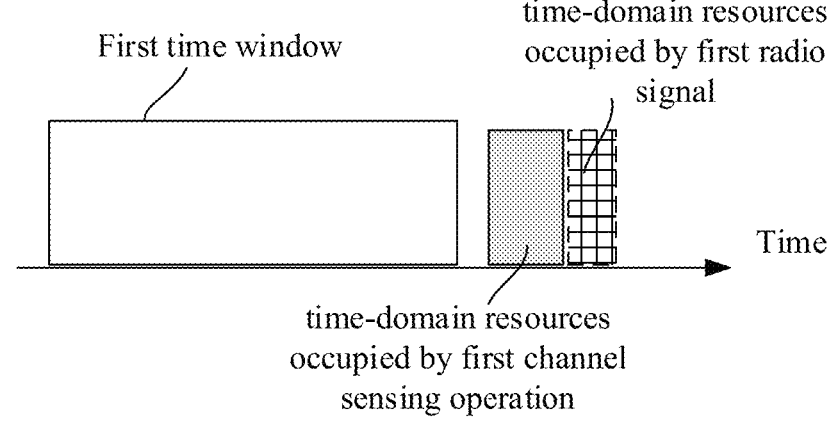
FIG. 8A illustrates a schematic diagram of time-domain resources occupied by a first radio signal and time-domain resources occupied by a first channel sensing operation according to one embodiment of the present application.

Embodiment 8A illustrates a schematic diagram of time-domain resources occupied by a first radio signal and time-domain resources occupied by a first channel sensing operation according to one embodiment of the present application, as shown in FIG. 8A. In FIG. 8A, time-domain resources occupied by a first radio signal are after the first time window, and a first channel sensing operation is performed before the time-domain resources occupied by the first radio signal. Herein, whether the first radio signal is transmitted is optional. When a result of the first channel sensing operation turns out that the first sub-band is idle, the first radio signal is transmitted; when a result of the first channel sensing operation turns out that the first sub-band is non-idle, the first radio signal is not transmitted. In FIG. 8A, the type of the first channel sensing operation is unrelated to the second reference signal resource group.

In one embodiment, when the first time-frequency resource group does not belong to the first time window in time domain, the type of the first channel sensing operation is the default channel sensing type.

In one embodiment, when the first time-frequency resource group does not belong to the first time window in time domain, the type of the first channel sensing operation is determined by scheduling information of the first radio signal.

Embodiment 8B

Figure 8B:
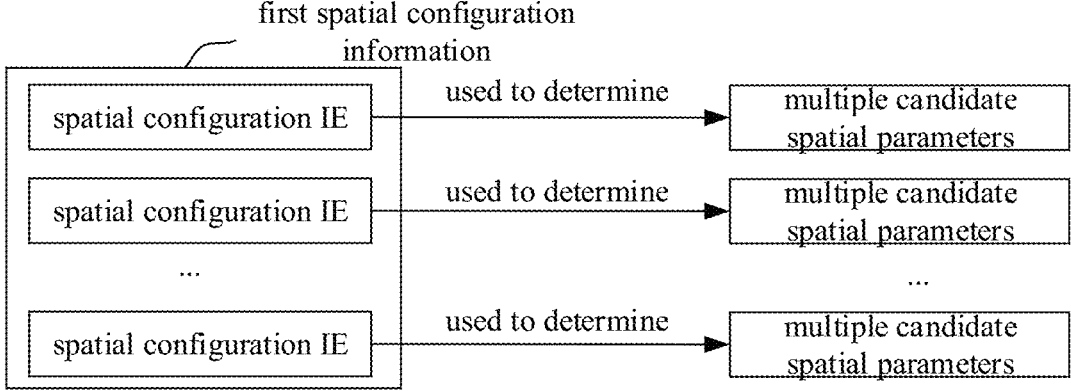
FIG. 8B illustrates a schematic diagram of first spatial configuration information according to one embodiment of the present application.

Embodiment 8B illustrates a schematic diagram of first spatial configuration information according to one embodiment of the present application, as shown in FIG. 8B. In FIG. 8B, the first spatial configuration information comprises multiple spatial configuration information units, any of the multiple spatial configuration information units being used to determine multiple candidate spatial parameters.

In one embodiment, the spatial configuration information unit comprises a TCI state.

In one embodiment, the spatial configuration information unit comprises a CSI-RS resource index.

In one subembodiment, a CSI-RS resource indicated by the CSI-RS resource index comprised in the spatial configuration information unit is QCL correlated with multiple reference signals.

In one subembodiment, a CSI-RS resource indicated by the CSI-RS resource index comprised in the spatial configuration information unit is transmitted using a wideband beam.

In one subembodiment, a CSI-RS resource indicated by the CSI-RS resource index comprised in the spatial configuration information unit is transmitted using multiple beams.

In one embodiment, the spatial configuration information unit comprises an SSB index.

In one subembodiment, an SSB indicated by the SSB index comprised in the spatial configuration information unit is QCL correlated with multiple reference signals.

In one subembodiment, an SSB indicated by the SSB index comprised in the spatial configuration information unit is transmitted using a wideband beam.

In one subembodiment, an SSB indicated by the SSB index comprised in the spatial configuration information unit is transmitted using multiple wideband beams.

In one embodiment, the spatial configuration information unit comprises a target index, and a first index set comprises multiple first indexes, the target index being one of the multiple first indexes, any of the multiple first indexes being used to determine multiple said candidate spatial parameters.

In one subembodiment, the first index comprises a TCI state group indication, and the candidate spatial parameter includes a TCI state, the TCI state group indication being used to determine multiple TCI states.

Embodiment 9A

Figure 9A:
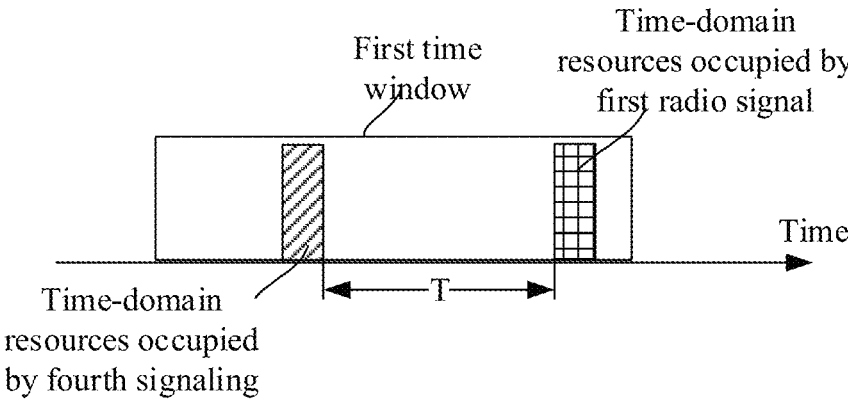
FIG. 9A illustrates a schematic diagram of time resources occupied by a fourth signaling and time resources occupied by a first radio signal according to one embodiment of the present application.
Figure 9A:
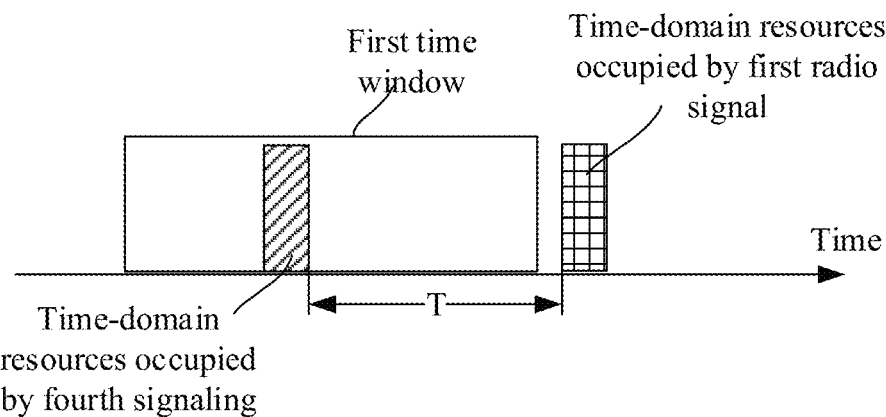

Embodiment 9A illustrates a schematic diagram of time resources occupied by a fourth signaling and time resources occupied by a first radio signal according to one embodiment of the present application, as shown in FIG. 9A. Herein, as shown in FIG. 9A_a, time-domain resources occupied by the fourth signaling and time-domain resources occupied by the first radio signal are within the first time window. As shown in FIG. 9A_b, time-domain resources occupied by the fourth signaling are within the first time window, while time-domain resources occupied by the first radio signal are after the first time window. As shown in FIG. 9A_a and FIG. 9A_b, time intervals between time resources occupied by the fourth signaling and time-domain resources occupied by the first radio signal are symbolized by T. In FIG. 9A, when T is smaller than a first threshold, a third reference signal resource group is used to determine a spatial parameter of the first radio signal; when T is no smaller than the first threshold and the first time-frequency resource group belongs to the first time window in time domain, the third reference signal resource group is used to determine a spatial parameter of the first radio signal; when T is no smaller than the first threshold and the first time-frequency resource group does not belong to the first time window in time domain, the second reference signal resource group is used to determine a spatial parameter of the first radio signal.

In one embodiment, a spatial parameter of the first radio signal includes a QCL parameter of the first radio signal.

In one embodiment, a spatial parameter of the first radio signal includes a QCL type of the first radio signal.

In one embodiment, a spatial parameter of the first radio signal includes a spatial relation of the first radio signal.

In one embodiment, a spatial parameter of the first radio signal includes a TCI state of the first radio signal.

In one embodiment, a spatial parameter of the first radio signal includes a spatial transmission filter of the first radio signal.

In one embodiment, a spatial parameter of the first radio signal includes a spatial reception filter of the first radio signal.

In one embodiment, a time interval between the first time-frequency resource group and the fourth signaling includes a time interval between a slot in which the first time-frequency resource group is comprised and a slot in which the fourth signaling is comprised.

In one embodiment, a time interval between the first time-frequency resource group and the fourth signaling includes a number of slots between a slot in which the first time-frequency resource group is comprised and a slot in which the fourth signaling is comprised.

In one embodiment, a time interval between the first time-frequency resource group and the fourth signaling includes a number of multicarrier symbols between an end time of a last multicarrier symbol of the first time-frequency resource group and a start time of a first multicarrier symbol of the fourth signaling.

In one embodiment, the fourth signaling comprises Hybrid Automatic Repeat reQuest ACKnolegment (HARQ-ACK) information of the second signaling.

In one embodiment, the fourth signaling is a physical layer signaling.

In one embodiment, the fourth signaling is transmitted through a PUSCH

In one embodiment, the fourth signaling is transmitted through a PUCCH

In one embodiment, the fourth signaling is transmitted through a PSFCH

In one embodiment, the second signaling is carried by a physical layer shared channel, the fourth signaling comprising HARQ-ACK information of the physical layer shared channel carrying the second signaling.

In one embodiment, the second signaling is carried by a PDSCH, the fourth signaling comprising HARQ-ACK information of the PDSCH carrying the second signaling.

In one embodiment, the third signaling is a higher layer signaling, the third signaling being used to indicate a spatial parameter of the first-type signal.

In one embodiment, the third signaling is a MAC layer signaling.

In one embodiment, the third signaling is an RRC layer signaling.

In one embodiment, the second signaling is a higher layer signaling, the second signaling being used to indicate a spatial parameter of the first-type signal.

In one embodiment, a spatial parameter of the first radio signal is the same as a spatial parameter of the first-type signal.

In one embodiment, the third signaling is transmitted before the second signaling, the second signaling being used to update a spatial parameter of the first-type signal indicated by the third signaling.

In one embodiment, the first threshold comprises a time length of a positive integer number of multicarrier symbol (s).

In one embodiment, the first threshold comprises a time length of a positive integer number of slot(s).

In one embodiment, the first threshold comprises a time length of a positive integer number of subframe(s).

In one embodiment, the first threshold comprises a time length of all subframes within 3 milliseconds (ms).

In one embodiment, the first threshold comprises a time length of all slots within 3 milliseconds (ms).

In one embodiment, the first threshold comprises a time length of all multicarrier symbols within 3 milliseconds (ms).

Embodiment 9B

Figure 9B:
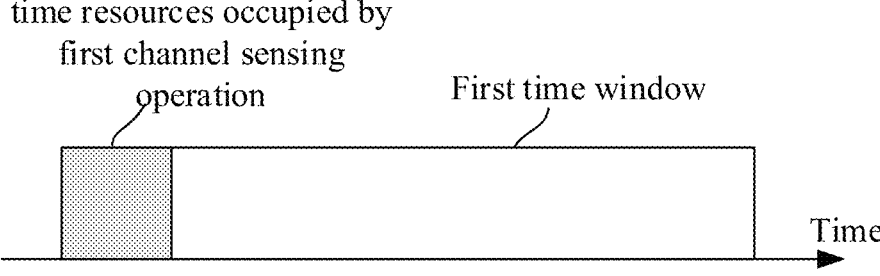
FIG. 9B illustrates a schematic diagram of a relationship between a first channel sensing operation and a first time window according to one embodiment of the present application.

Embodiment 9B illustrates a schematic diagram of a relationship between a first channel sensing operation and a first time window according to one embodiment of the present application, as shown in FIG. 9B. In FIG. 9B, the box in grey represents time resources occupied by the first channel sensing operation, while the box in white represents time resources occupied by the first time window. The first time configuration information in the present application is used to determine a first time window, the first spatial configuration information being valid within the first time window.

In one embodiment, a length of the first time window is determined by the first time configuration information, the first spatial configuration information being valid within the first time window.

In one embodiment, the first time window is later than completion of the first channel sensing operation.

In one embodiment, the first time configuration information is transmitted in the second signaling.

In one embodiment, the first configuration information is used to determine Channel Occupancy Time (COT).

In one embodiment, the first configuration information is used to determine an end of a COT.

In one embodiment, the first configuration information is used to determine a start and an end of a COT.

In one embodiment, the first configuration information is used to determine a time length of a COT.

In one embodiment, the first time window is within a duration of a COT.

In one embodiment, an end of the first time window is the same as an end of the COT.

In one embodiment, an end of the first time window is the same as an end of a last downlink symbol in the COT.

In one embodiment, a start of the first time window is a start of a first multicarrier symbol that follows after receiving a physical channel used for transmitting the first configuration information.

In one embodiment, a start of the first time window is a start of a COT.

In one embodiment, the first channel sensing operation comprises performing energy detection on a first sub-band, the energy detection being used to determine whether the first sub-band is idle, and frequency resources occupied by the second signaling belonging to the first sub-band.

In one embodiment, an implementer for the first channel sensing operation is the second node.

In one embodiment, the first channel sensing operation comprises performing N5 energy detections respectively in N5 time sub-pools on the first sub-band to obtain N5 detection values, N5 being a positive integer.

In one embodiment, multi-antenna-related receptions respectively used by the N5 energy detections are the same.

In one embodiment, the N5 energy detections are used to determine whether the first sub-band is idle.

In one embodiment, the N5 energy detections are used to determine whether the first sub-band can be used by the first node for transmitting a radio signal.

In one embodiment, the N5 energy detections are used to determine whether the first sub-band can be used by the first node for transmitting a radio signal spatially related to the N5 energy detections.

In one embodiment, the first sub-band comprises a range of frequency occupied by a positive integer number of RB(s).

In one embodiment, the first sub-band comprises a Bandwidth Part (BWP).

In one embodiment, the first sub-band comprises a Carrier Component (CC).

In one embodiment, the N5 energy detections are energy detections in Listen Before Talk (LBT), for the specific definition and way of implementation of the LBT, refer to 3GPP TR37.213.

In one embodiment, the N5 energy detections are energy detections in ClearChannelAssessment (CCA), for the specific definition and way of implementation of the CCA, refer to 3GPPTR 36.889.

In one embodiment, any of the N5 energy detections is implemented by measuring a Received Signal Strength Indication (RSSI).

In one embodiment, time-domain resources occupied by any of the N5 time sub-pools are contiguous.

In one embodiment, the N5 time sub-pools are mutually orthogonal (i.e., non-overlapping) in time domain.

In one embodiment, a duration of any of the N5 time sub-pools is one of 16 s or 9 s.

In one embodiment, there are at least two time sub-pools among the N5 time sub-pools having unequal durations.

In one embodiment, any two time sub-pools among the N5 time sub-pools have equal durations.

In one embodiment, time-domain resources occupied by the N5 time sub-pools are contiguous.

In one embodiment, there are at least two time sub-pools among the N5 time sub-pools occupying time-domain resources that are not contiguous.

In one embodiment, time-domain resources occupied by any two time sub-pools among the N5 time sub-pools are not contiguous.

In one embodiment, any of the N5 time sub-pools is a slot duration.

In one embodiment, any time sub-pool among the N5 time sub-pools other than an earliest time sub-pool is a slot duration.

In one embodiment, there is at least one time sub-pools that has a duration of 16 s among the N5 time sub-pools.

In one embodiment, there is at least one time sub-pools that has a duration of 9 s among the N5 time sub-pools.

In one embodiment, an earliest time sub-pool among the N5 time sub-pools has a duration of 16 s.

In one embodiment, a latest time sub-pool among the N5 time sub-pools has a duration of 9 s.

In one embodiment, the N5 time sub-pools comprise listening time in Cat 4 LBT.

In one embodiment, the N5 time sub-pools comprise slot durations in a Defer Duration and slot durations in a Backoff Time in Cat 4 LBT.

In one embodiment, the N5 time sub-pools comprise slot durations in a DeferDuration and slot durations in a Backoff Time in a Type 1 UL channel access procedure, where the first node is a UE.

In one embodiment, the N5 time sub-pools comprise slot durations in an initial CCA and an EnhancedClearChannelAssessment (eCCA).

In one embodiment, the N5 detection values are respectively obtained by the N5 energy detections.

In one embodiment, the N5 detection values are respectively received powers obtained by the second node in N5 time units by sensing powers of all radio signals on the first sub-band and averages in time; the N5 time units are respectively N5 continuous durations in the N5 time sub-pools.

In one subembodiment, a duration of any of the N5 time units is no shorter than 4 s.

In one embodiment, the N5 detection values are respectively received energies obtained by the second node in N5 time units by sensing energies of all radio signals on the first sub-band and averages in time; the N5 time units are respectively N5 continuous durations in the N5 time sub-pools.

In one subembodiment, a duration of any of the N5 time units is no shorter than 4 s.

In one embodiment, any given energy detection of the N5 energy detections refers to: the first node monitoring a received power in a given time unit, the given time unit being a continuous duration in a time sub-pool corresponding to the given energy detection among the N5 time sub-pools.

In one embodiment, any given energy detection of the N5 energy detections refers to: the first node monitoring a received energy in a given time unit, the given time unit being a continuous duration in a time sub-pool corresponding to the given energy detection among the N5 time sub-pools.

Embodiment 10A

Figure 10A:
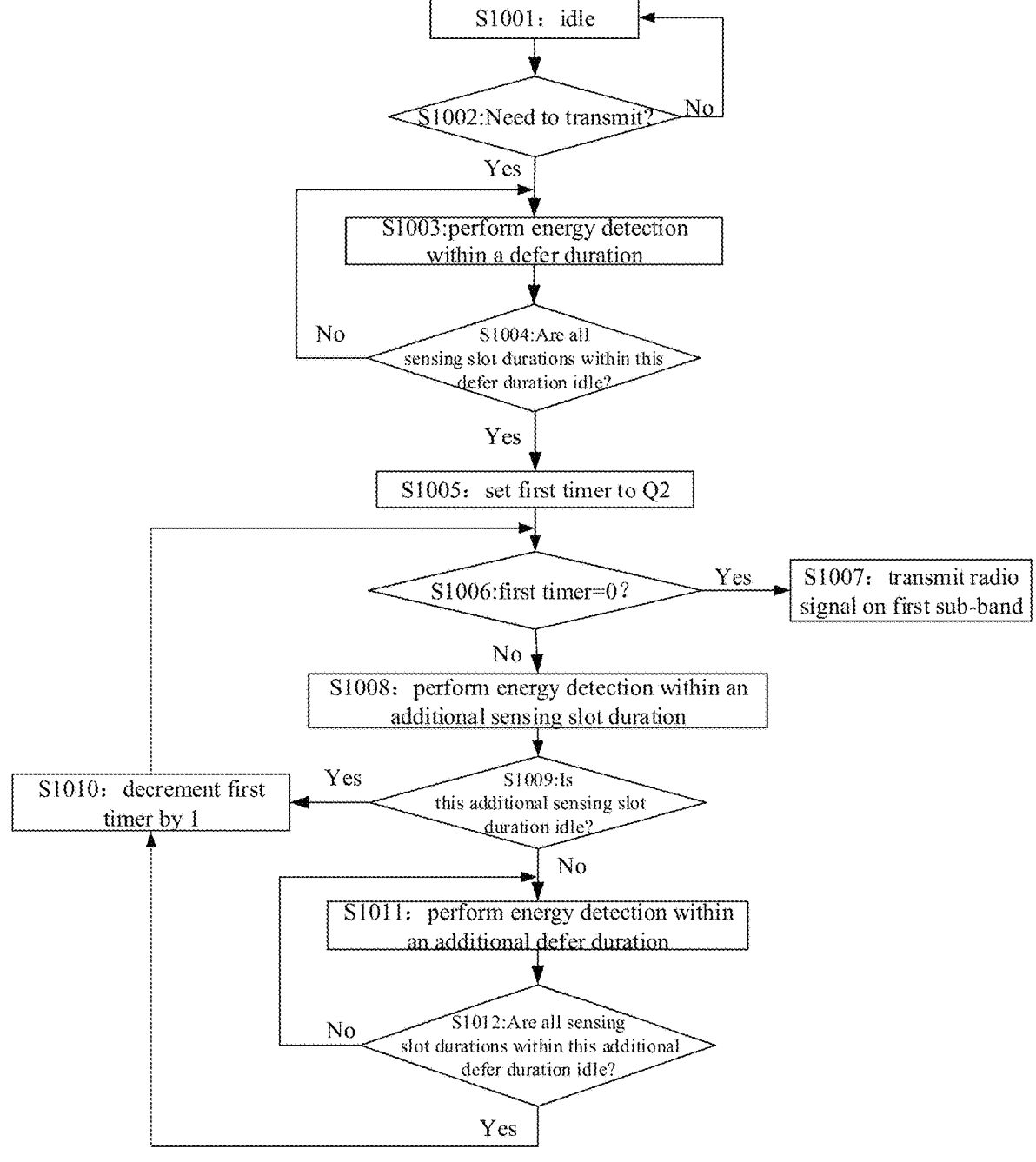
FIG. 10A illustrates a schematic diagram of a first candidate channel sensing operation according to one embodiment of the present application.

Embodiment 10A illustrates a schematic diagram of a first candidate channel sensing operation according to one embodiment of the present application, as shown in FIG. 10A.

In Embodiment 10A, the first candidate channel sensing operation comprises performing Q2 energy detections respectively in the Q2 time sub-pools on the first sub-band to obtain Q2 detection values, where Q2 is a positive integer; when and only when each of Q3 detection value(s) of the Q2 detection values is lower than a first sensing threshold, a radio signal is transmitted in the first sub-band, and a start time of transmitting the radio signal is no earlier than an end of the first time window, Q3 being a positive integer no greater than Q2. The procedure of the Q2 energy detections can be depicted by the flowchart in FIG. 10A.

In FIG. 10A, the first node or the second node is in an idle state in step S1001, determines whether it needs to transmit in step S1002; performs energy detection in a defer duration in step S1003; and determines in step S1004 whether all sensing slot durations within the defer duration are idle, if so, move forward to step S1005 to set a first counter to Q2; otherwise, go back to step S1004; determines in step S1006 whether the first counter is 0, if so, proceed to step S1007 to transmit a radio signal on the first sub-band in the present application; otherwise, move forward to step S1008 to perform energy detection in an additional sensing slot duration; and determines in step S1009 whether the additional sensing slot duration is idle, if so, proceed to step S1010 to decrement the first counter by 1 and return to step S1006; otherwise, proceed to stepS1011 to perform energy detection in an additional defer duration; determines whether all sensing slot durations within the additional defer duration are idle in step S1012, if so, move forward to step S1010; otherwise, go back to step S1011.

In one embodiment, any sensing slot duration in a given duration comprises one of the Q2 time sub-pools; the given duration is any duration among all defer durations, all additional sensing slot durations and all additional defer durations comprised in FIG. 10A.

In one embodiment, performing energy detection in a given duration refers to: performing energy detection in all sensing slot durations within the given duration; the given duration is any duration among all defer durations, all additional sensing slot durations and all additional defer durations comprised in FIG. 10A.

In one embodiment, being determined to be idle through energy detection in a given duration refers to: all sensing slot durations comprised in the given duration are determined to be idle through energy detection; the given duration is any duration among all defer durations, all additional sensing slot durations and all additional defer durations comprised in FIG. 10A.

In one embodiment, a given sensing slot duration being determined to be idle through energy detection refers to: the first node sensing powers of all radio signals on the first sub-band in a given time unit and averaging in time, through which a received power obtained is lower than the first sensing threshold; the given time unit is a continuous duration in the given sensing slot duration.

In one subembodiment, a duration of the given time unit is no shorter than 4 s.

In one embodiment, a given sensing slot duration being determined to be idle through energy detection refers to: the first node sensing energies of all radio signals on the first sub-band in a given time unit and averaging in time, through which a received energy obtained is lower than the first sensing threshold; the given time unit is a continuous duration in the given sensing slot duration.

In one subembodiment, a duration of the given time unit is no shorter than 4 s.

In one embodiment, a given sensing slot duration being determined to be idle through energy detection refers to: the first node performing energy detection on time sub-pools comprised in the given sensing slot duration, through which a detection value obtained is lower than the first sensing threshold; the time sub-pool belongs to the Q2 time sub-pools, the detection value belonging to the Q2 detection values.

In one embodiment, performing energy detection in a given duration refers to: performing energy detection in all time sub-pools within the given duration; the given duration is any duration among all defer durations, all additional sensing slot durations and all additional defer durations comprised in FIG. 10A; all of the time sub-pools belong to the Q2 time sub-pools.

In one embodiment, being determined to be idle through energy detection in a given duration refers to: detection values obtained by performing energy detections on all time sub-pools comprised in the given duration are lower than the first sensing threshold; the given duration is any duration among all defer durations, all additional sensing slot durations and all additional defer durations comprised in FIG. 10A; all of the time sub-pools belong to the Q2 time sub-pools, the detection value belonging to the Q2 detection values.

In one embodiment, a defer duration lasts as long as 16 μs+M2*9 s, M2 being a positive integer.

In one subembodiment, a defer duration comprises M1+1 time sub-pools among the Q2 time sub-pools.

In one subembodiment, a priority corresponding to the first signal in the present application is used to determine the M1.

In one reference embodiment of the above subembodiment, the priority is a Channel Access Priority Class; for the specific definition of the Channel Access Priority Class, refer to 3GPP TS37.213.

In one subembodiment, M2 is one of {1, 2, 3, 7}.

In one embodiment, multi-antenna-related reception parameters respectively used by the Q2 energy detections are the same.

In one embodiment, the Q2 energy detections are used to determine whether the first sub-band is idle.

In one embodiment, the Q2 energy detections are used to determine whether the first sub-band can be used by the first node for transmitting a radio signal.

In one embodiment, the Q2 energy detections are used to determine whether the first sub-band can be used by the first node for transmitting a radio signal spatially related to the Q2 energy detections.

In one embodiment, the Q2 energy detections are energy detections in Listen Before Talk (LBT), for the specific definition and way of implementation of the LBT, refer to 3GPP TS37.213.

In one embodiment, the Q2 energy detections are energy detections in ClearChannelAssessment (CCA), for the specific definition and way of implementation of the CCA, refer to 3GPPTR36.889.

In one embodiment, any of the Q2 energy detections is implemented by means of a way defined in 3GPP TS37.213.

In one embodiment, any of the Q2 energy detections is implemented by means of the way of energy detection in WiFi.

In one embodiment, any of the Q2 energy detections is implemented by measuring a Received Signal Strength Indication (RSSI).

In one embodiment, any of the Q2 energy detections is implemented by means of the way of energy detection in LTE LAA.

In one embodiment, each of the Q2 detection values is measured in dBm.

In one embodiment, each of the Q2 detection values is measured in mW.

In one embodiment, each of the Q2 detection values is measured in Joule.

In one embodiment, Q3 is less than Q2.

In one embodiment, Q2 is greater than 1.

In one embodiment, the first sensing threshold is measured in dBm.

In one embodiment, the first sensing threshold is measured in mW.

In one embodiment, the first sensing threshold is measured in Joule.

In one embodiment, the first sensing threshold is equal to or less than −72 dBm.

In one embodiment, the first sensing threshold is any value equal to or less than a first given value.

In one subembodiment, the first given value is pre-defined.

In one subembodiment, the first given value is configured by a higher-layer signaling, where the first node is a UE.

In one embodiment, the first type comprised in the first candidate type set in the present application includes the first candidate channel sensing operation.

In one embodiment, a second candidate channel sensing operation comprises: performing Q4 energy detections respectively in a second time window on the first sub-band to obtain Q4 detection values, where Q4 is a positive integer; when and only when each of Q5 detection value(s) of the Q4 detection values is lower than a first sensing threshold, the first sub-band is used for transmitting a radio signal, Q5 being a positive integer no greater than Q4.

In one subembodiment, a length of the second time window is pre-defined.

In one subembodiment, a length of the second time window includes one of {9 μs, 16 μs, 25 μs}.

In one embodiment, the second type comprised in the first candidate type set in the present application includes the second candidate channel sensing operation.

In one embodiment, the second channel sensing operation in the present application is the first candidate channel sensing operation.

Embodiment 10B

Figure 10B:
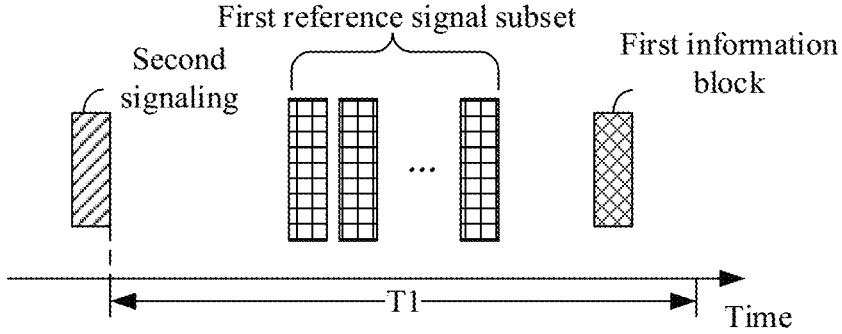
FIG. 10B illustrates a schematic diagram of time-domain resources respectively occupied by a second signaling, a first reference signal subset and a first information block according to one embodiment of the present application.

Embodiment 10B illustrates a schematic diagram of time-domain resources respectively occupied by a second signaling, a first reference signal subset and a first information block according to one embodiment of the present application, as shown in FIG. 10B. In FIG. 10B, the first reference signal subset is transmitted after the second signaling, and the first information block is transmitted after the first reference signal subset. Time resources occupied by the first reference signal subset and time resources occupied by the first information block are both within a first time window, in FIG. 10B, T1 symbolizes a duration of the first time window.

In one embodiment, a start of the first time window is an end of a last multicarrier symbol used for transmitting the second signaling.

In one embodiment, a number of bits comprised in the first information block is related to a number of reference signals comprised in the first reference signal subset.

In one subembodiment, the first reference signal subset comprises N3 reference signal(s), N3 being a positive integer, and a number of bits comprised in the first information block changes synchronously with the value of N3.

In one subembodiment, the first reference signal subset comprises N3 CSI-RS resource(s), N3 being a positive integer, and a number of bits comprised in the first information block is related to the value of ceil(log 2(N3)), where log 2 is an operation to obtain a logarithm with 2 as the base, and ceil is an operation of rounding up a number to a nearest integer.

In one subembodiment, the first reference signal subset comprises N3 CSI-RS resource(s), N3 being a positive integer, the first information block comprises a CSI-RS resource indication, a number of bits comprised in the CSI-RS resource indication being equal to ceil(log 2(N3)), where log 2 is an operation to obtain a logarithm with 2 as the base, and ceil is an operation of rounding up a number to a nearest integer.

In one embodiment, time resources occupied by the first information block are located within the first time window.

Embodiment 11A

Figure 11A:
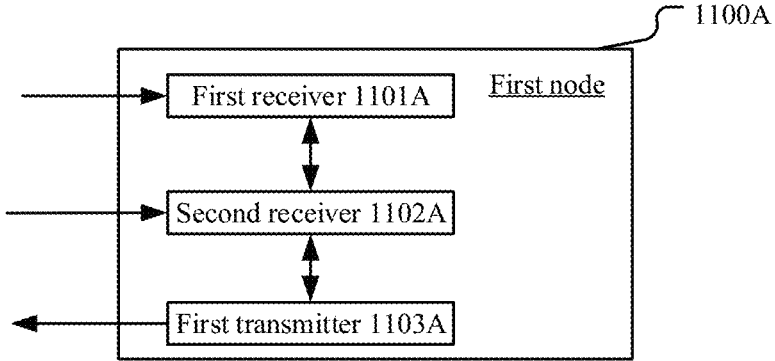
FIG. 11A illustrates a structure block diagram of a processing device in a first node.

Embodiment 11A illustrates a structure block diagram of a processing device used in a first node, as shown in FIG. 11A. In Embodiment 11A, the first node 1100A is comprised of a first receiver 1101A, a second receiver 1102A and a first transmitter 1103A.

In one embodiment, the first receiver 1101A comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the second receiver 1102A comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 1103A comprises at least one of the antenna 420, the transmitter/receiver 418, the multi-antenna transmitting processor 471, the transmitting processor 416, the controller/processor 475 or the memory 476 in FIG. 4 of the present application.

In Embodiment 11A, the first receiver 1101A receives a first signaling and a second signaling; and the second receiver 1102A performs a first channel sensing operation on a first sub-band; the first transmitter 1103A transmits a first radio signal in a first time-frequency resource group in the first sub-band, or, drops transmitting a first radio signal in a first time-frequency resource group in the first sub-band; herein, the first signaling is used to determine a first reference signal resource group, the first signaling being non-unicast; the second signaling indicates a second reference signal resource group; when the first time-frequency resource group belongs to a first time window in time domain, the first reference signal resource group and the second reference signal resource group are used together to determine a type of the first channel sensing operation from a first candidate type set, and when the first time-frequency resource group does not belong to the first time window in time domain, the type of the first channel sensing operation is unrelated to the second reference signal resource group; the first candidate type set comprises a first type and a second type.

In one embodiment, the first node 1100A is a UE.
In one embodiment, the first node 1100A is a relay node.
In one embodiment, the first node 1100A is a base station.
In one embodiment, the first node 1100A is vehicle-mounted communication equipment.
In one embodiment, the first node 1100A is a UE supporting V2X communications.
In one embodiment, the first node 1100A is a relay node supporting V2X communications.
In one embodiment, the first node 1100A is a base station supporting IAB.

Embodiment 11B

Figure 11B:
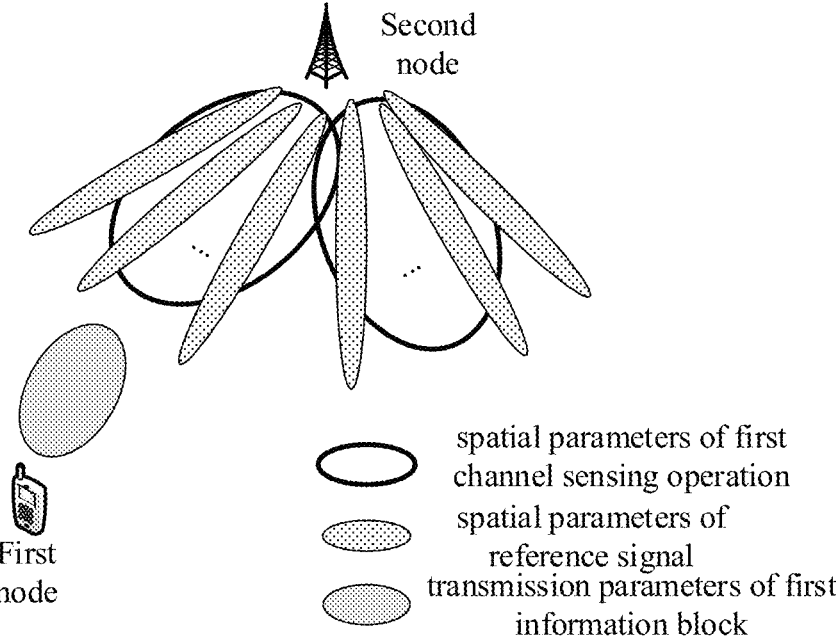
FIG. 11B illustrates a schematic diagram of relations among a spatial parameter of a first channel sensing operation, a spatial parameter of reference signals and a transmit parameter of a first information block according to one embodiment of the present application.

Embodiment 11B illustrates a schematic diagram of relations among a spatial parameter of a first channel sensing operation, a spatial parameter of reference signals and a transmit parameter of a first information block according to one embodiment of the present application, as shown in FIG. 11B. In FIG. 11B, the ellipse is used for representing the beam width. In FIG. 11B, spatial parameters of a first channel sensing operation are related to the width of a receiving beam of the first channel sensing operation; spatial parameters of a reference signal are related to the width of a transmitting beam of the reference signal; transmission parameters of a first information block are related to a transmitting beam of the first information block. In FIG. 11B, the receiving beam of the first channel sensing operation is a wide beam, in which widths of transmitting beams of multiple said reference signals are contained. Performing LBT with a wide beam can reduce a total number of times of LBT, which contributes to a lower overhead.

In one embodiment, the first channel sensing operation uses a wide beam for reception.

In one embodiment, the first spatial configuration information is related to spatial parameters of the first channel sensing operation.

In one embodiment, spatial parameters indicated by the first spatial configuration information are the same as spatial parameters of the first channel sensing operation.

In one embodiment, a beam coverage corresponding to spatial parameters indicated by the first spatial configuration information is overlapped with a beam coverage corresponding to spatial parameters of the first channel sensing operation.

In one embodiment, spatial parameters of the first channel sensing operation include a reception beam configuration of the first channel sensing operation.

In one embodiment, spatial parameters of the first channel sensing operation include a spatial reception parameter configuration of the first channel sensing operation.

In one embodiment, spatial parameters of the first channel sensing operation include a QCL correlation between a receiving behavior of the first channel sensing operation and a reference signal, the reference signal being a CSI-RS resource or an SSB.

In one embodiment, the first spatial configuration information is used to determine a transmission parameter of the first information block.

In one embodiment, the first spatial configuration information is used to determine a candidate spatial parameter associated with an uplink channel.

In one embodiment, the first spatial configuration information is used to determine a candidate spatial parameter associated with a PUCCH.

In one embodiment, the first spatial configuration information is used to determine a candidate spatial parameter associated with a PUSCH.

In one embodiment, the candidate spatial parameter associated with the uplink channel includes a Sounding Reference Signal Resource Indicator (SRI).

In one embodiment, the candidate spatial parameter associated with the uplink channel includes a TCI.

In one embodiment, the candidate spatial parameter associated with the uplink channel includes a QCL correlation with a CSI-RS resource.

In one embodiment, the candidate spatial parameter associated with the uplink channel includes a QCL correlation with an SSB.

In one embodiment, a transmission parameter of the first information block includes a spatial parameter associated with the first information block.

In one embodiment, a transmission parameter of the first information block includes time-frequency resources occupied by the first information block.

In one embodiment, a transmission parameter of the first information block includes a PUCCH resource number associated with the first information block.

In one embodiment, the phrase that "the first spatial configuration information is used to determine a transmission parameter of the first information block" comprises that the first spatial configuration information comprises information that indicates the transmission parameter of the first information block.

In one embodiment, the phrase that "the first spatial configuration information is used to determine a transmission parameter of the first information block" comprises that the first spatial configuration information comprises multiple candidate spatial parameters associated with the uplink channel, and that the first node selects one of the multiple candidate spatial parameters associated with the uplink channel as the transmission parameter of the first information block.

In one subembodiment, the first node receives a selection rule indication, and then selects one of the multiple candidate spatial parameters associated with the uplink channel according to the selection rule indication to serve as the transmission parameter of the first information block.

In one subembodiment, the first node selects one of the multiple candidate spatial parameters associated with the uplink channel according to a pre-defined selection rule to serve as the transmission parameter of the first information block.

In one embodiment, the first spatial configuration information is related to a spatial parameter of a first channel sensing operation, the first channel sensing operation being used to determine whether a radio signal can be transmitted on a first sub-band, frequency-domain resources occupied by the second signaling belonging to the first sub-band.

In one embodiment, frequency-domain resources occupied by the first information block belong to a first sub-band.

Embodiment 12A

Figure 12A:
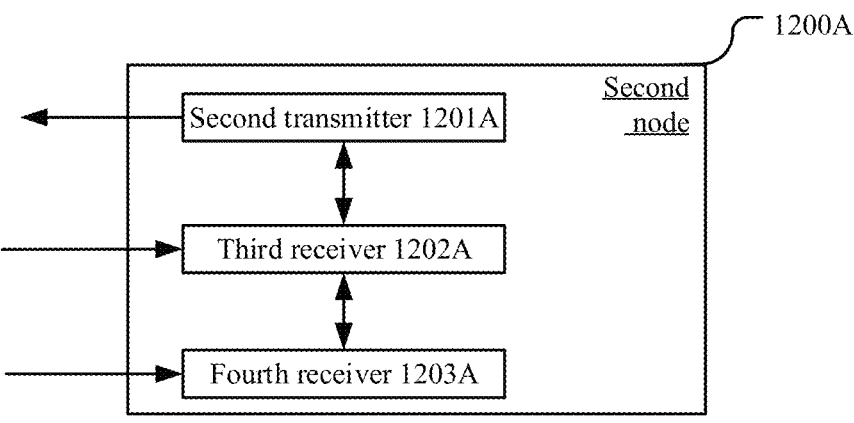
FIG. 12A illustrates a structure block diagram of a processing device in a second node.

Embodiment 12A illustrates a structure block diagram of a processing device used in a second node, as shown in FIG. 12A. In FIG. 12A, the second node 1200A is comprised of a second transmitter 1201A, a third receiver 1202A and a fourth receiver 1203A.

In one embodiment, the second transmitter 1201A comprises at least one of the antenna 420, the transmitter/receiver 418, the multi-antenna transmitting processor 471, the transmitting processor 416, the controller/processor 475 or the memory 476 in FIG. 4 of the present application.

In one embodiment, the third receiver 1202A comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the fourth receiver 1203A comprises at least one of the antenna 452, the transmitter/receiver 454, the multi-antenna receiving processor 458, the receiving processor 456, the controller/processor 459, the memory 460 or the data source 467 in FIG. 4 of the present application.

In Embodiment 12A, the second transmitter 1201A transmits a first signaling and a second signaling; and the third receiver 1202A performs a second channel sensing operation on a first sub-band; the fourth receiver 1203A performs a first detecting operation on a first time-frequency resource group on the first sub-band, the first detecting operation being used to determine whether a first radio signal is received on the first time-frequency resource group; herein, the first signaling is used to determine a first reference signal resource group, the first signaling being non-unicast; the second signaling indicates a second reference signal resource group; the second channel sensing operation is used to determine a first time window; a first channel sensing operation is used to determine whether the first radio signal is transmitted, where a performer of the first channel sensing operation is a receiver for the second signaling; when the first time-frequency resource group belongs to a first time window in time domain, the first reference signal resource group and the second reference signal resource group are used together to determine a type of the first channel sensing operation from a first candidate type set, when the first time-frequency resource group does not belong to the first time window in time domain, the type of the first channel sensing operation is unrelated to the second reference signal resource group; the first candidate type set comprises a first type and a second type.

In one embodiment, the second signaling indicates the first time-frequency resource group, the first radio signal and the second reference signal resource group being spatially correlated.

In one embodiment, further comprising: the second transmitter 1201A also transmits a third signaling before transmitting the second signaling, the third signaling indicating a third reference signal resource group; the fourth receiver 1203A receives a fourth signaling, the fourth signaling being used to determine whether the second signaling is correctly received; herein, when a time interval between the first time-frequency resource group and the fourth signaling is smaller than a first threshold, the third reference signal resource group is used to determine a spatial parameter of the first radio signal; when a time interval between the first time-frequency resource group and the fourth signaling is no smaller than the first threshold and the first time-frequency resource group belongs to the first time window in time domain, the third reference signal resource group is used to determine a spatial parameter of the first radio signal; when a time interval between the first time-frequency resource group and the fourth signaling is no smaller than the first threshold and the first time-frequency resource group does not belong to the first time window in time domain, the second reference signal resource group is used to determine a spatial parameter of the first radio signal.

In one embodiment, when the first time-frequency resource group belongs to the first time window in time domain, and the first reference signal resource group and the second reference signal resource group are spatially correlated, the type of the first channel sensing operation is determined to be a second type.

In one embodiment, before the second transmitter 1201A transmits the first signaling, the type of the first channel sensing operation is determined to be a first type; when the first time-frequency resource group belongs to a first time window in time domain, and the first reference signal resource group and the second reference signal resource group are spatially correlated, the type of the first channel sensing operation is switched from the first type to the second type.

In one embodiment, further comprising: the second transmitter 1201A also transmitting a fifth signaling; wherein the fifth signaling comprises an indication of transmitting the first radio signal; when the first time-frequency resource group belongs to a first time window in time domain, and the first reference signal resource group and the second reference signal resource group are not spatially correlated, the indication of transmitting the first radio signal is used to determine whether the first radio signal is allowed to be transmitted.

In one embodiment, when the first time-frequency resource group belongs to a first time window in time domain, a channel access priority of the first radio signal is used to determine the type of the first channel sensing operation.

In one embodiment, the second node 1200A is a UE.

In one embodiment, the second node 1200A is a relay node.

In one embodiment, the second node 1200A is a base station.

In one embodiment, the second node 1200A is vehicle-mounted communication equipment.

In one embodiment, the second node 1200A is a UE supporting V2X communications.

In one embodiment, the second node 1200A is a relay node supporting V2X communications.

In one embodiment, the second node 1200A is a base station supporting IAB.

Embodiment 12B

Figure 12B:
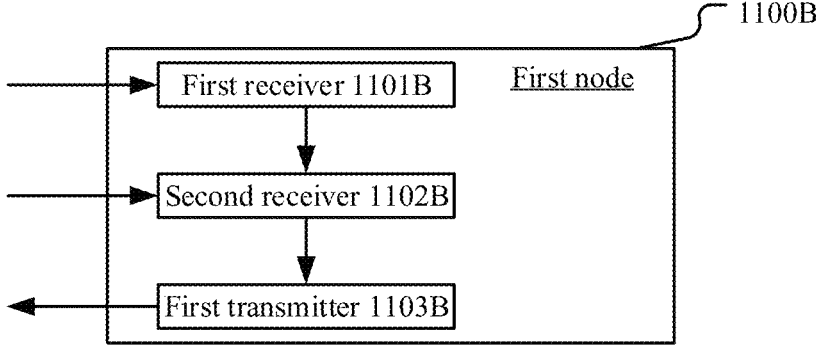
FIG. 12B illustrates a structure block diagram of a processing device in a first node.

Embodiment 12B illustrates a structure block diagram of a processing device used in a first node, as shown in FIG. 12B. In Embodiment 12B, the first node 1100B is comprised of a first receiver 1101B, a second receiver 1102B and a first transmitter 1103B.

In one embodiment, the first receiver 1101B comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the second receiver 1102B comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 1103B comprises at least one of the antenna 420, the transmitter/receiver 418, the multi-antenna transmitting processor 471, the transmitting processor 416, the controller/processor 475 or the memory 476 in FIG. 4 of the present application.

In Embodiment 12B, the first receiver 1101B receives a first signaling; the second receiver 1102B receives a second signaling; and the first transmitter 1103B transmits a first information block; herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, the first node 1100B is a UE.

In one embodiment, the first node 1100B is a relay node.

In one embodiment, the first node 1100B is a base station.

In one embodiment, the first node 1100B is vehicle-mounted communication equipment.

In one embodiment, the first node 1100B is a UE supporting V2X communications.

In one embodiment, the first node 1100B is a relay node supporting V2X communications.

In one embodiment, the first node 1100B is a base station supporting IAB.

In one embodiment, a number of bits comprised in the first information block is related to a number of reference signals comprised in the first reference signal subset.

In one embodiment, the first spatial configuration information is used to determine multiple candidate spatial parameters; a spatial parameter associated with any said reference signal in the first reference signal subset is one of the multiple candidate spatial parameters.

In one embodiment, the second receiver 1102B receives first time configuration information, the first time configuration information being used to determine a first time window, the first spatial configuration information being valid within the first time window.

In one embodiment, the first spatial configuration information is related to a spatial parameter of a first channel sensing operation, the first channel sensing operation being used to determine whether a radio signal can be transmitted on a first sub-band, frequency-domain resources occupied by the second signaling belonging to the first sub-band.

In one embodiment, the first node assumes that any reference signal of the Q1 reference signals that does not belong to the first reference signal subset is not transmitted within the first time window.

In one embodiment, the first spatial configuration information is used to determine a transmission parameter of the first information block.

Embodiment 13

Figure 13:
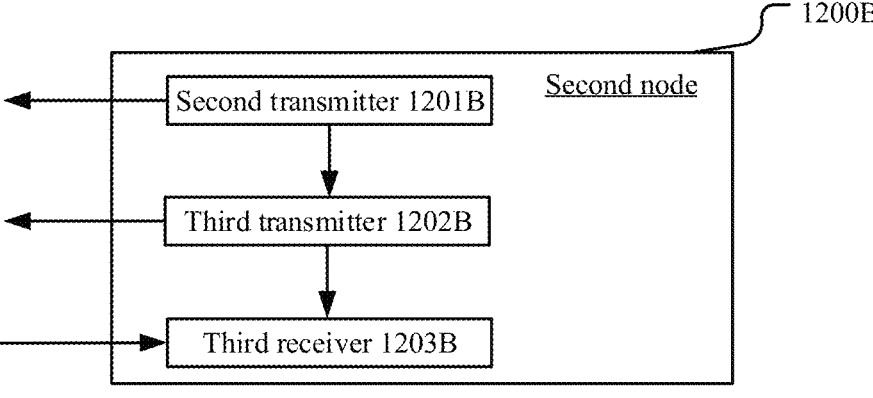
FIG. 13 illustrates a structure block diagram of a processing device in a second node.

Embodiment 13 illustrates a structure block diagram of a processing device used in a second node, as shown in FIG. 13. In FIG. 13, the second node 1200B is comprised of a second transmitter 1201B, a third transmitter 1202B and a third receiver 1203B.

In one embodiment, the second transmitter 1201B comprises at least one of the antenna 420, the transmitter/receiver 418, the multi-antenna transmitting processor 471, the transmitting processor 416, the controller/processor 475 or the memory 476 in FIG. 4 of the present application.

In one embodiment, the third transmitter 1202B comprises at least one of the antenna 420, the transmitter/receiver 418, the multi-antenna transmitting processor 471, the transmitting processor 416, the controller/processor 475 or the memory 476 in FIG. 4 of the present application.

In one embodiment, the third receiver 1203B comprises at least one of the antenna 452, the transmitter/receiver 454, the multi-antenna receiving processor 458, the receiving processor 456, the controller/processor 459, the memory 460 or the data source 467 in FIG. 4 of the present application.

In Embodiment 13, the second transmitter 1201B transmits a first signaling; the third transmitter 1202B transmits a second signaling; and the third receiver 1203B receives a first information block; herein, the first signaling comprises first configuration information, the first configuration information being used to determine Q1 spatial parameters respectively associated with Q1 reference signals, Q1 being an integer greater than 1; the second signaling comprises first spatial configuration information, the first spatial configuration information being used to determine a first reference signal subset in the Q1 reference signals, the first reference signal subset comprising partial reference signals of the Q1 reference signals, and a spatial parameter associated with each reference signal in the first reference signal subset is related to the first spatial configuration information; a result of measurements on reference signals in the first reference signal subset is used to determine the first information block.

In one embodiment, a number of bits comprised in the first information block is related to a number of reference signals comprised in the first reference signal subset.

In one embodiment, the first spatial configuration information is used to determine multiple candidate spatial parameters; a spatial parameter associated with any said reference signal in the first reference signal subset is one of the multiple candidate spatial parameters.

In one embodiment, the third transmitter 1202B transmits first time configuration information, the first time configuration information being used to determine a first time window, the first spatial configuration information being valid within the first time window.

In one embodiment, the first spatial configuration information is related to a spatial parameter of a first channel sensing operation, the first channel sensing operation being used to determine whether a radio signal can be transmitted on a first sub-band, frequency-domain resources occupied by the second signaling belonging to the first sub-band.

In one embodiment, the second node does not transmit any reference signal of the Q1 reference signals that does not belong to the first reference signal subset within the first time window.

In one embodiment, the first spatial configuration information is used to determine a transmission parameter of the first information block.

In one embodiment, the second node 1200B is a UE.

In one embodiment, the second node 1200B is a base station.

In one embodiment, the second node 1200B is a relay node.

In one embodiment, the second node 1200B is a UE supporting V2X communications.

In one embodiment, the second node 1200B is a base station supporting V2X communications.

In one embodiment, the second node 1200B is a relay node supporting V2X communications.

In one embodiment, the second node 1200B is a base station supporting IAB.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station or network equipment in the present application includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a transceiver configured to receive a first signaling and a second signaling;
the transceiver configured to perform a channel sensing operation on a sub-band, wherein the channel sensing operation includes directional listen before talk (LBT) for multiple transmitting beams;
a processor operatively coupled to the transceiver, the processor configured to determine, based on the channel sensing operation, whether to transmit a radio signal in a time-frequency resource group on the sub-band, or, to not transmit the radio signal in the first time-frequency resource group on the sub-band,
wherein the first signaling is used to determine a first information, the first signaling being non-unicast,
wherein the second signaling indicates a second information,
wherein the time-frequency resource group is within a first time window in a time domain,
wherein the first time window is a channel occupancy time (COT),
wherein the first information and the second information are used together to determine a type of the first channel sensing operation from a first candidate type set,
wherein the first candidate type set comprises at least a first type and a second type; and
the transceiver further configured to transmit or not transmit the radio signal based on the determination by the processor.

2. The first node according to claim 1, wherein the second signaling indicates the first time-frequency resource group.

3. The first node according to claim 1, comprising:
the transceiver configured to receive a third signaling before receiving the second signaling, the third signaling indicating a third reference signal resource group; and
the transceiver configured to transmit a fourth signaling, the fourth signaling being used to determine whether the second signaling is correctly received at a receiver.

4. The first node according to claim 1, wherein the channel occupancy time (COT) is after the channel sensing operation.

5. The first node according to claim 1, wherein before the first receiver receives the first signaling, an initial channel sensing operation is performed.

6. The first node according to claim 1, wherein a first reference signal resource group and a second reference signal resource group are not spatially correlated, wherein the reference signal resource group is determined from the first signaling, and second reference signal resource group is indicated by the second signaling.

7. The first node according to claim 1, wherein the channel sensing operation is performed on spectrum above 52.6 GHz.

8. A second node for wireless communications, comprising:

a transceiver configured to transmit a first signaling and a second signaling;

the transceiver configured to perform a channel sensing operation on a sub-band, wherein the channel sensing operation includes directional listen before talk (LBT) for multiple transmitting beams; and the transceiver configured to receive a radio signal on a time-frequency resource group, wherein the first signaling is used to indicate a first information, the first signaling being non-unicast, wherein the second signaling indicates a second information, wherein the channel sensing operation is used to determine a first time window, wherein the time-frequency resource group is within the first time window in time domain, wherein the first time window is a channel occupancy time (COT), wherein both the first information and the second information indicate parameters for determining a type of the channel sensing operation from a first candidate type set, and wherein the first candidate type set comprises at least a first type and a second type.

9. The second node according to claim 8, wherein the second signaling indicates the first time-frequency resource group.

10. The second node according to claim 8, comprising:

the transceiver configured to transmit a third signaling before receiving the second signaling, the third signaling indicating a third reference signal resource group; and the transceiver configured to receive a fourth signaling, the fourth signaling being used to determine whether the second signaling is correctly received at the second node.

11. The second node according to claim 8, wherein the channel occupancy time (COT) is after the channel sensing operation.

12. The second node according to claim 8, wherein before the second transmitter transmits the first signaling, an initial channel sensing operation is performed.

13. The second node according to claim 8, wherein the reference signal resource group and a second reference signal resource group are not spatially correlated, wherein the reference signal resource group is determined from the first signaling, and second reference signal resource group is indicated by the second signaling.

14. The second node according to claim 8, wherein the channel sensing operation on spectrum above 52.6 GHz.

15. A method performed by a first node for wireless communications, comprising:

receiving a first signaling and a second signaling;

performing a channel sensing operation on a sub-band, wherein the channel sensing operation includes directional listen before talk (LBT) for multiple transmitting beams;

transmitting a radio signal in a time-frequency resource group on the sub-band, or, or not to transmitting the radio signal in the time-frequency resource group on the sub-band based on performing the channel sensing operation, wherein the first signaling is used to determine a first information, the first signaling being non-unicast, wherein the second signaling indicates a second information, wherein the time-frequency resource group is within a first time window in time domain, wherein the first time window is a channel occupancy time (COT), wherein the first information and the second information are used together to determine a type of the first channel sensing operation from a first candidate type set, and wherein the first candidate type set comprises at least a first type and a second type.

16. The method according to claim 15, wherein the second signaling indicates the first time-frequency resource group.

17. The method according to claim 15, comprising:

receiving a third signaling before receiving the second signaling, the third signaling indicating a third reference signal resource group; and transmitting a fourth signaling, the fourth signaling being used to determine whether the second signaling is correctly received.

18. The method according to claim 15, the channel occupancy time (COT) is after the channel sensing operation.

19. The method according to claim 15, wherein the channel sensing operation is performed on spectrum above 52.6 GHz.

20. The method according to claim 15, wherein the reference signal resource group and a second reference signal resource group are not spatially correlated, wherein the reference signal resource group is determined from the first signaling, and second reference signal resource group is indicated by the second signaling.

* * * * *